United States Patent [19]
Kohda et al.

[11] Patent Number: 5,966,701
[45] Date of Patent: Oct. 12, 1999

[54] RECOGNITION AND JUDGEMENT APPARATUS HAVING VARIOUS LEARNING FUNCTIONS

[75] Inventors: Toshiyuki Kohda; Keiichi Miyazaki, both of Yokohama, Japan

[73] Assignee: Matsushita Electric Industrial Co., Ltd., Osaka, Japan

[21] Appl. No.: 08/668,588

[22] Filed: Jun. 19, 1996

[30] Foreign Application Priority Data

| Jun. 21, 1995 | [JP] | Japan | 7-153742 |
| Sep. 21, 1995 | [JP] | Japan | 7-243368 |
| Sep. 28, 1995 | [JP] | Japan | 7-251291 |
| Dec. 26, 1995 | [JP] | Japan | 7-339408 |
| May 9, 1996 | [JP] | Japan | 8-114809 |

[51] Int. Cl.$^6$ ............................. G06E 1/00; G06E 3/00; G06F 15/18
[52] U.S. Cl. ............................. 706/20; 706/25; 706/26
[58] Field of Search .............................. 706/16, 23, 244

[56] References Cited

U.S. PATENT DOCUMENTS

| 4,774,677 | 9/1988 | Buckley | 706/23 |
| 5,027,406 | 6/1991 | Roberts et al. | 704/244 |
| 5,175,797 | 12/1992 | Funabashi et al. | 706/16 |
| 5,323,471 | 6/1994 | Hayashi | 382/158 |
| 5,432,868 | 7/1995 | Obata et al. | 382/187 |
| 5,479,533 | 12/1995 | Tanaka | 382/161 |
| 5,479,570 | 12/1995 | Imagawa et al. | 382/159 |
| 5,528,699 | 6/1996 | Obata et al. | 382/121 |
| 5,619,619 | 4/1997 | Shinohara et al. | 706/28 |
| 5,680,627 | 10/1997 | Anglea et al. | 706/16 |

FOREIGN PATENT DOCUMENTS

| 0374604 | 6/1990 | European Pat. Off. . |
| 0378689 | 7/1990 | European Pat. Off. . |
| 0527567 | 2/1993 | European Pat. Off. . |

OTHER PUBLICATIONS

Yoseph Linde et al., "An Algorithm for Vector Quantizer Design", IEEE Transactions on Communications, vol. COM–28, No. 1, Jan. 1980, pp. 84–95.

Ken'ichi Hotta et al., A Large Scale Neutral Network "CombNet–II", Paper Journal of the Institute of Electronic Information and Communications, D–II, vol. J75–D–II No. 3, pp. 545–553, Mar. 1992.

David E. Rumelhart et al., "Learning representations by back–propagating errors", vol. 323, Oct. 9, 1986, pp. 533–536.

System and Computers in Japan, vol. 21, No. 9, 1990, pp. 89–97, XP000220504 Tatsuo Matsuoka et al: "Syllable Recognition Using Integrated Neural Networks".

IEEE Transactions on Neural Networks, vol. 6, No. 2, Feb. 1, 1995, pp. 497–501, XP000492677, Cho Sung–Bae et al: "Multiple Network Fusion Using Fuzzy Logic".

*Primary Examiner*—Tariq R. Hafiz
*Assistant Examiner*—Wilbert Starks, Jr.
*Attorney, Agent, or Firm*—Lowe Hauptman Gopstein Gilman & Berner

[57] ABSTRACT

A fuzzy rough classification section 7 classifies an input pattern into a plurality of category groups and calculates their attribution factors. A plurality of fine classification sections 8 calculate similarities in respective category groups. In each fine classification section 8, a weight change amount control section 82 controls the weight change amount in an associated similarity calculating section 81 in accordance with the group attribution factor selected by a second group selecting section (10), thereby enabling a cooperative learning operation among plural fine classification sections 8. A force learning control section 17 performs a supplemental learning operation, if the input pattern is rejected regardless of its correctness, until its reject judge value is reduced below a predetermined reject threshold.

16 Claims, 14 Drawing Sheets

RECOGNITION AND JUDGEMENT APPARATUS HAVING VARIOUS LEARNING FUNCTIONS

BACKGROUND OF THE INVENTION

1. Field of the Invention

The present invention generally relates to a learning type recognition & judgement apparatus performing a learning operation of an input pattern data and recognizing the same.

2. Prior Art

According to this kind of conventional apparatus, an input pattern data is roughly classified to select the category group to which the input data belongs. Next, in the selected category group, fine classification is performed to recognize the input data. For example, this kind of learning type recognition & judgement apparatus is disclosed in "A Large Scale Neutral Network CombNET-II", Paper Journal of the Institute of Electronic Information and Communications, D-II Vol. J75-D-II No.3 pp545–553.

FIG. 15 is a schematic block diagram showing an arrangement of a conventional learning type recognition & judgement apparatus. In FIG. 15, reference numeral 1 represents a rough classification section which comprises a plurality of input sections 1a and a plurality of multi input/output signal processing sections 1b. With this arrangement, rough classification section 1 calculates an output value (adaptation or fidelity) of each category group with respect to the input pattern signal X, thereby roughly classifying the input pattern signal into respective category groups. Reference numeral 2 represents each of a plurality of fine classification sections. Each fine classification section 2 comprises a plurality of input section 2a, a plurality of multi input/output signal processing sections 2b and a maximum value selecting section 2c. With this arrangement, each fine classification section 2 finely classifies the input signal in each category group.

More specifically, a fine classification input signal selecting section 4 generates the input pattern signal which is entered into each fine classification section 2 through input sections 2a. Each multi input/output signal processing section 2b multiplies the output of an associated lower-layer input section 2a or multi input/output signal processing section 2b with a weighting coefficient reflecting a degree of connection, and sums up resultant multiplication results. Then, thus obtained summation value is processed by an appropriate threshold, and is then outputted.

These plural multi input/output signal processing section 2b are arranged in a multi-layer structure without no mutual connection in each layer. And the network is constituted so as to propagate signals only to upper layers, thereby obtaining the similarity degree of the input pattern signal to each category in the category group. Maximum value selecting section 2c selects the maximum value among the outputs generated from plural multi input/output signal processing sections 2b of the most-highest layer.

Reference numeral 3 represents a group selecting section which selects a plurality of category groups among the output values (adaptations) of rough classification section 1. The above-described fine classification section input signal selecting section 4 selects a fine classification section 2, to which the input pattern signal is entered, based on the group selecting information obtained in group selecting section 3. Reference numeral 5 represents a discriminating section which comprises a plurality of similarity calculating sections 5a and a category discriminating section 5b. Each similarity calculating section 5a calculates a similarity of each category based on the adaptation of the category group selected by group selecting section 3 and the output value of the fine classification section 2 corresponding to its category group. Then, category discriminating section 5b finds out the maximum value of the resultant similarities of categories, thereby discriminating the input pattern signal X.

An operation of the above-described conventional learning type recognition & judgement apparatus will be explained, hereinafter. Input pattern signal X, consisting of n feature data of an object to be recognized, is expressed by the following equation 1.

$$X = (x_1, x_2, \cdots, x_n) \tag{1}$$

This input pattern signal X is first entered into the input sections 1a of rough classification section 1. There are provided a total of "n" input sections 1a; this number "n" is; equal to the number of feature data of the pattern data. Each feature data $x_i$ is entered into a corresponding input section 1a. Each multi input/output signal processing section 1b multiplies each input $x_j$ entered from its associated input section 1a with a relevant weighting coefficient $v_{ij}$ ($1 \leq i \leq m_r$; $m_r$ is the number of category group, $1 \leq j \leq n$) representing the degree of linkage therebetween, and obtains the sum of all multiplication results. As expressed by the following equation: 2, the obtained result is referred to as a weighting coefficient vector $V_i$ of the input pattern signal X and each multi. input/output signal processing section 1b.

$$V_i = (v_{i1}, v_{i2}, \cdots, v_{in}) \tag{2}$$

Multi input/output signal processing section 1b outputs a value obtained by dividing the multiplication result by the norm $|X|, |V_i|$ of the equations (1) and (2). More specifically, the output value sim $(X, V_i)$ of a multi input/output signal processing section 1b is expressed by the following equation 3 using its weighting coefficient vector $V_i$.

$$\text{sim } (X, V_i) = (X \cdot V_i)/(|X| \cdot |V_i|) \tag{3}$$

where $X \cdot V_i = \Sigma_j (x_j \cdot v_{ij})$
$|X| = (\Sigma x_j^2)^{0.5}$
$|Vi| = (\Sigma v_{ij}^2)^{0.5}$ Weighting coefficient vector $V_i$ is designed beforehand too let a predetermined multi input/output signal processing section 1b generate a maximum output in response to a similar input pattern signal.

This kind of weighting coefficient vector Vi has been conventionally designed in the following manner. First of all, in a first step, in response to each entry of the input pattern signal X for designing the weighting coefficient vector, a vector $V_c$ having the most-largest sim $(X, V_i)$ is obtained to bring $V_c$ into a closer relation to X. In other words, X is optimally matched with $V_c$. If a predetermined number of input pattern signals are optimally matched with a particular weighting coefficient vector, a region covered by this weighting coefficient vector is divided into two.

Next, in a second step, optimal matching vector $V_i$ is obtained for each of all the input pattern signals used for designing the weighting coefficient vector. Then, it is checked whether there is any change in a comparison between a resultant one and the previous one. If any change is found, a corresponding vector $V_i$ is modified. In this case, the region covered by this weighting coefficient vector is divided appropriately in the same manner as in the first step. The second step is repetitively performed until modification and division are no longer required.

By executing the design of the weighting coefficient vector in this manner, the input pattern signal is roughly classified into a plurality of category groups. The output of each multi input/output signal processing section 1b, which represents an adaptation of each category group with respect to the input pattern signal X, is sent to group selecting section 3.

Group selecting section 3 selects an arbitrary number of category groups in order of the largeness of the adaptation obtained in rough classification section 1, and separately generates the group selecting information indicating the selected category groups and the corresponding adaptations. Based on the group selecting information obtained from group selecting section 3, fine classification input signal selecting section 4 selects fine classification sections 2 into which the input pattern signal should be entered, and sends the input pattern signal to these selected fine classification sections 2.

In each of the fine classification sections 2 corresponding to the category groups selected by group selecting section 3 (i.e. fine classification sections 2 which received the input pattern signal X from fine classification input signal selecting section 4), the input pattern signal X is first entered into input sections 2a. There are provided a total of "n" input sections 2a; this number "n" is equal to the-number of feature data of the input pattern signal X. Each feature data $x_i$ is entered into its corresponding input section 2a. Each multi input/output signal processing section 2b in the fine classification section 2 multiplies the output of an associated lower-layer input section 2a or multi input/output signal processing section 2b with a weighting coefficient representing the degree of connection, and sums up resultant multiplication results. Then, thus obtained summation value is converted through an appropriate threshold function, and is then sent to its upper layer. The total number of multi input/output signal processing section 2b constituting the most-highest layer is identical with the number of categories of the pattern data involved in each category group. Hence, each multi input/output signal processing section 2b of the most-highest layer is related to each of these categories in a one-to-one relationship. Maximum value selecting section 2c selects the maximum one of outputs generated from multi input/output signal processing sections 2b of the most-highest layer, and sends out this maximum output value together with a category corresponding to the selected multi input/output signal processing section 2b.

The weight coefficients of each multi input/output signal processing section 2b are learned beforehand in such a manner that, when the input pattern signal involves each category in the category group, the highest-layer multi input/output signal processing section 2b corresponding to each category always generates the maximum output.

More specifically, this kind of weighting coefficient learning operation is carried out by the learning algorithm generally called the "back-propagating error method", which is disclosed, for example, in "Learning Representations by Back-Propagating Errors," by D. E. Rumelhart, G. E. Hinton and R. J. Williams, Nature, vol.323, pp.533–536, Oct. 9, 1986.

Hereinafter, an abstract of the back-propagating error method will be explained.

First, the input pattern signal X used for learning the weighting coefficients is entered into input sections 2a of fine classification section 2. As described above, each multi input/output signal processing section 2b in the fine classification section 2 multiplies the output of an associated lower-layer input section 2a or multi input/output signal processing section 2b with a weighting coefficient representing the degree of connection, and sums up resultant multiplication results. Thus obtained summation value is converted through an appropriate threshold function, and is then sent to its upper layer.

Assuming that "$o_k$" represents an output signal of all of multi input/output signal processing sections 2b of the most-highest layer while "$t_k$" represents a desirable output signal (which is generally called "teacher signal"), an error "E" is defined by the following equation 4.

$$E = 0.5 \Sigma_p \Sigma_k (t_k - o_k)^2 \tag{4}$$

where $\Sigma_p$ represents the sum relating to the pattern number of the teacher signal. The purpose of the learning operation is to determine a weighting coefficient which minimizes this error E. A change amount $\Delta w_{ij}$ of the weighting coefficient between multi input/output signal processing sections 2b is calculated based on the following equation 5.

$$\Delta w_{ij} = -\epsilon \delta E / \delta w_{ij} \tag{5}$$

where $\epsilon$ represents a positive constant which is generally called the learning rate.

Error E can be reduced by repeating the renewal of the weighting coefficient based on the equation 5 in response to each entry of the learning pattern signal. When the error E becomes a small value enough to judge that the output signal is almost equalized with the desirable value, the learning operation is terminated.

By using such a weighting coefficient learning method, it becomes possible to set optimal weight coefficients capable of letting the highest-layer multi input/output signal processing section 2b corresponding to each category always generates the maximum output when the input pattern signal involves each category in the category group. Accordingly, it becomes possible to recognize the category of the input pattern signal in each category group, i.e. in each fine classification section, in accordance with the selecting operation of the maximum value selecting section 2c which identifies a specific highest-layer multi input/output signal processing section 2b generating the maximum output.

In the discriminating section 5, each similarity calculating sections 5a calculates a similarity of each category obtained in the fine classification section 2 based on the adaptation of the category group selected by group selecting section 3 and the output value of the fine classification section 2 corresponding to its category group, using the following equation 6.

$$(\text{Similarity}) = (\text{Adaptation})^a \cdot (\text{Output value})^b \tag{6}$$

where a and b are real constants.

Finally, category discriminating section 5b compares the resultant similarities of respective categories obtained from similarity calculating sections 5a, and finds out the category having the maximum similarity, thereby outputting a final discriminating result.

However, according to the conventional above-described arrangement, the learning operation in each fine classification section 2 is independently performed without considering the distance, i.e. group attribution factor, between the group reference pattern and the input pattern signal to be learned. Hence, there was a problem that the recognition accuracy would be undesirably deteriorated when the input pattern signal was positioned on the boundary of category groups. Furthermore, if a non-learned learning pattern is erroneously recognized or rejected nevertheless it's correctness, it is no longer impossible to cure or undo it.

Moreover, when the recognition is rejected, it was impossible to perform a reject processing with reference to the category groups or categories of the rejected data.

SUMMARY OF THE INVENTION

Accordingly, in view of above-described problems encountered in the prior art, a principal object of the present invention is to provide a learning type recognition & judgement apparatus capable of performing a cooperative learning operation among plural fine classification sections with reference to group attribution factors with respect to the input pattern signal, thereby improving the recognition accuracy for the input pattern signal positioned on the boundary of the category groups, and effectively performing supplementary learning and reject processing operations which are useful to reduce the erroneous recognition or rejected correct-answer data.

In order to accomplish this and other related objects, the present invention provides the following novel and excellent learning type recognition & judgement apparatus. Reference numerals in parentheses, added in the following description, are merely used for the purpose of helping understanding the present invention and not used for narrowly interpreting the scope of claims of the present invention.

A primary aspect of the present invention provides a learning type recognition & judgement apparatus comprising: a group dictionary section (6) for memorizing a plurality of group reference pattern signals representative of category groups consisting of a set of similar patterns; a fuzzy rough classification section (7) for calculating group attribution factors of each input pattern signal with reference to the group reference pattern signals, each of the group attribution factors representing an attribution degree of the input pattern signal to each category group; a first group selecting section (9) for selecting at least one of category groups based on the group attribution factors; a plurality of fine classification sections (8), each including a similarity calculating section (81) and a weight change amount control section (82), the similarity calculating section (81) calculating an in-group similarity representing a similarity degree of the input pattern signal with respect to each category involved in the same category group, while the weight change amount control section (82) controlling a weight change amount of an associated similarity calculating section (81) in accordance with an output of a second group selecting section (10); a discrimination signal weighting section (11) which weights the in-group similarities obtained by fine classification sections (8) based on the group attribution factors of the category groups selected by first group selecting section (9); a category similarity calculating section (12) which obtains a category similarity representing a belonging degree to each category based on an output of the discrimination signal weighting section (11); a recognition result calculating section (13) which generates a recognition result or a reject signal based on the category similarity calculated by the category similarity calculating section (12); a teacher signal generating section (14) which generates a teacher signal required to learn the fine classification section (8); a category information memory section (15) which memorizes category information belonging to each fine classification section (8); the second group selecting section (10) selecting at least one larger group attribution factors in the fine classification sections (8) comprising the category of the input pattern signal, based on the category information memorized in the category information memory section (15); a learning control section (16) which controls a learning operation of each fine classification section (8) in accordance with a comparison between the recognition result of the recognition result calculating section (13) and a category of input pattern outputted from the teacher signal generating section (14); a recognition result display section (18) which displays a judgement result of the recognition result calculating section (13); a correct-answer input section (19) which inputs a correct recognition result when the recognition result is erroneous or rejected regardless of its correctness; and a supplementary learning control section (17) which controls the learning operation of specific fine classification sections (8) relating to erroneously recognized data or rejected correct-answer data with reference to the correct recognition result entered from the correct-answer input section (19).

With this arrangement, the input pattern signal is entered into the fuzzy rough classification section (7). Fuzzy rough classification section (7) reads out all the group reference pattern signals memorized in the group dictionary section (6) and obtains group attribution factors representing the belonging degree of the input pattern signal to each category group. Using these group attribution factors, the first group selecting section (9) selects at least one category group and outputs it to the discriminating signal weighting section (11). In each fine classification section (8), the similarity calculating section (81) calculates the in-group similarity vector representing the similarity degree of the input pattern signal with respect to each category involved in the same category group, which is sent to the discriminating signal weighting section (11). The discrimination signal weighting section (11) gives a weight to each in-group similarity vector obtained by fine classification sections (8) based on the corresponding group attribution factors of the category groups selected by first group selecting section (9), which are sent to category similarity calculating section (12).

The category similarity calculating section (12) obtains the category similarity representing the belonging degree of the input data to each category by adding the weighted in-group similarity vectors in connection with category. The recognition result calculating section (13) performs recognition based on the category similarity calculated and sends the recognition result to the learning control section (16). The recognition result calculating section (13) generates, as well as the recognition result, the reject signal representing the fact that the recognition is failed or unfeasible.

The learning control section (16) compares the recognition result with the category number (teacher signal) of the input pattern outputted from the teacher signal generating section (14). When the compared data agree with each other, weight renewal is not performed in each fine classification section (8) and the learning operation of the next learning pattern is performed. When the comparison does not meet, the weight values in respective fine classification sections (8) are renewed.

In the renewal of weight values, second group selecting section (10) selects at least one of larger group attribution factors in the fine classification sections (8) comprising categories of the input pattern based on the category information memorized in the category information memory section (15). The selected plural category groups are sent to weight change amount control section (82).

In this manner, when the discrimination result to a certain learning pattern signal is erroneous, the second group selecting section (10) selects a limited number of category groups having larger attribution factors. The fine classification sections (8) corresponding to these selected category groups perform the cooperative learning operation by adjusting their weight change amounts with reference to the attribution factors. Hence, it becomes possible to accurately learn the pattern even if it is positioned near the boundary of the category group, thereby increasing the recognition rate.

Furthermore, providing the supplementary learning control section (17) allows the following operations. When the recognition result is erroneous, the (additional) learning operation in the fine classification section (8) selected by the second group selecting section (10) is controlled with reference to the entered correct recognition result until the resultant recognition result is equalized with the correct recognition result. Furthermore, in case of the rejected correct-answer data, the (force) learning operation in the fine classification section (8) selected by the second group selecting section (10) is controlled until the reject judge value is reduced below the predetermined reject threshold. Accordingly, it becomes possible to reduce the number of erroneous recognition and rejected correct-answer.

Furthermore, as the renewal of weight values is carried out only for the fine classification sections (8) relating to the supplementary learning pattern, it becomes possible to realize an excellent supplementary learning operation which gives no adverse effect to the overall function of the recognition & judgement apparatus as well as the recognition ability of the already-learned data.

According to features of preferred embodiments of the present invention, it is desirable that the similarity calculating section (81) is constituted by a multi-layer structure comprising a most-lowest layer consisting of a plurality of third unit recognizers (q), a previous or preceding layer of the most-lowest layer consisting of a plurality of second unit recognizers (p), and another layer consisting of a plurality of first unit recognizers (k).

The first unit recognizer (k) comprising: a signal input section (31) receiving an input signal; a quantizer (32) converting the input signal into a quantized level; a neighboring section selector (34) selecting a neighboring quantized section of a concerned quantized section corresponding to the input signal; a weight table (33$d$) memorizing weight values corresponding to the quantized section of the input signal and its neighboring quantized section; a route input section (33$a$) having at least one route input terminal; a route output section (33$b$) having at least one route output terminal; and a route weighting section (33$c$) varying a linkage intensity between the route input terminal of the route input section (33$a$) and the route output terminal of the route output section (33$b$) by changing a setting position of each weight to be applied to the route in accordance with a quantized result.

The second unit recognizer (p) comprising: a signal input section (41) receiving an input signal; a quantizer (42) converting the input signal into a quantized level; a route input section (43$a$) having at least one route input terminal; a route output section (43$b$) having at least one route output terminal; a transfer amount change section (44) shifting a transmission value by several bits when the transmission value is entered from the route input terminal of the route input section (43$a$), and a learning unit (43$C_0$) renewing linkage intensity between the route input terminal and a route output terminal of the route output terminal (43$b$) indicated by an output of the quantizer (42) in accordance with an output of the transfer amount change section (44).

And, the third unit recognizer (q) comprising: an adder (53$a_0$) adding input signals entered through its plural route input terminals, and a threshold processing unit (53$b_0$) processing an output of the adder (53$a_0$) by a given threshold.

It is also desirable that the similarity calculating section (81) further comprises a teacher signal converting section (61) which converts an output of the teacher signal generating section (14) into a signal identifying a specific third unit recognizer (q) which should generate a maximum output in the fine classification section (8), and an output of the teacher signal converting section (61) is entered into the signal input section (41) of the second unit recognizers (p).

Furthermore, it is desirable that the weight change amount control section (82) controls a bit shift amount in the transfer amount change section (44) of a corresponding similarity calculating section (81) in response to the output of the second group selecting section (10).

Still further, it is desirable that the weight change amount control section (82) controls a total number of learning operations in a corresponding similarity calculating section (81) in response to the output of the second group selecting section (10).

Yet further, it is desirable that the recognition result calculating section (13) selects a maximum category similarity and a second-largest category similarity to obtain a reject judge value equivalent to a ratio of the selected two category similarities, and generates a reject signal when the reject judge value is larger than a predetermined reject threshold.

Moreover, it is desirable that the fuzzy rough classification section (7) comprises a plurality of distance calculating sections (26) calculating distances between the input pattern signal (X) and all of the group reference pattern signals ($V_1$, $V_2$, - - - , $V_r$) memorized in the group dictionary section (6), a plurality of dividers (27) obtaining reciprocals of outputs generated from the distance calculating sections (26), an adder (28) obtaining a sum of outputs of the dividers (27), a plurality of multipliers (29) multiplying an output of the adder (28) with each output of the distance calculating sections (26), and a plurality of another dividers (30) obtaining reciprocals of outputs of the multipliers (29).

Furthermore, it is desirable that the supplementary learning control section (17) controls the (additional) learning operation of the fine classification section (8) until a resultant recognition result is substantially equalized with the correct recognition result.

Yet further, it is preferable that the learning type recognition & judgement apparatus of the present invention further comprises: a group number selecting section (113) which selects a group number having a maximum group attribution factor among fine classification sections (8) involving the category of an input data based on the category information memorized in the category information memory section (15); an additional learning information memory section (115) which memorizes an erroneously recognized input data, its corresponding category number and the selected group number; an error recognition data counting section (116) which counts the number of erroneous recognition data in connection with each group number and each category based on the information memorized in the additional learning information memory section (115); and a first additional learning candidate selecting section (117) which selects an input data and a category number corresponding to the group number and the category number which are large in the number of the erroneous recognition data counted by the error recognition data counting section (116).

With this arrangement, when a non-learned evaluation data is entered, a recognition result of this evaluation data is generated from the recognition result calculating section (13) and is displayed on the recognition result display section (18). When this recognition result is different from the teacher signal, the group number selecting section (113) selects the group number having the maximum group attribution factor with respect to the evaluation data. The correct category number entered from the correct-answer input section (19) is memorized, together with the evaluation data, in the error recognition information memory section (115). The error recognition data counting section (116) counts the number of erroneous recognition data in connection with each group number and each category number based on the data memorized in the error recognition information memory section (115). The first additional learning candidate selecting section (117) selects the data corresponding to the group number and the category number which are large in the number of the erroneous recognition data thus counted. Then, these data are subjected to the learning operation, thereby realizing the additional learning operation.

In this manner, providing the first additional learning candidate selecting section (17) makes it possible to perform the additional learning operation chiefly or primarily on the fine classification sections or categories of the group numbers having low recognition ability without applying the additional learning operation to all of the erroneous recognition data. Hence, the efficiency of the additional learning operation can be improved.

Furthermore, according to the features of the preferred embodiments, it is desirable that the learning type recognition & judgement apparatus of the present invention further comprises: a reference data memory section (97) which memorizes reference data and a teacher signal used for evaluating a learning result relating to the data selected by the first additional learning candidate selecting section (117); an additional learning result acceptability judging section (120) which judges the acceptability of an additional learning operation by evaluating the recognition result relating to the reference data, and a second additional learning candidate selecting section (121) which selects only additional learning candidate data judged acceptable in the additional learning result acceptability judging section (120).

With this arrangement, the additional learning candidate data is selected, and the additional learning operation is applied to the group numbers and categories having lower recognition ability. Upon every execution of the learning operation, the reference data is recognized to evaluate the result of each additional learning operation. Based on the recognition result of this reference data, it is judged whether the result of the concerned additional learning operation is acceptable or not. Then, only the additional learning candidate data judged acceptable is selected by the second additional learning candidate selecting section (121), and is subjected to the final additional leaning operation.

In this manner, providing the additional learning result acceptability judging section (120) and the second additional learning candidate data selecting section (121) makes it possible to select additional learning candidate data while confirming what kind of effect is given to the reference data which is the target data to be recognized by the present invention recognition & judgement apparatus. Thus, useless additional learning data can be deleted and hence the efficiency of the additional learning operation can be improved.

Yet further, it is desirable that the additional learning result acceptability judging section (120) judges the acceptability of the additional learning operation based on a change of a value defined by a sum of the number of rejected data and a multiple (integer not less than 1) of the number of erroneous recognition data before and after the additional learning operation.

Still further, it is desirable that the supplementary learning control section (17) controls the learning operation of the fine classification section (8) until a reject judge value is reduced below a predetermined threshold.

Moreover, according to the features of the preferred embodiments, it is desirable that the learning type recognition & judgement apparatus further comprising: a first group number selecting section (92) which selects a group number having the maximum group attribution factor among fine classification sections (8) involving the category of an input data based on the category information memorized in the category information memory section (15); a force learning data memory section (94) which memorizes a rejected correct-answer input data, its corresponding category number (teacher signal) and the selected group number; a rejected correct-answer data number counting section (95) which counts the number of rejected correct-answer data in connection with each of group number and category based on the information memorized in the force learning data memory section (94); and a first force learning candidate data selecting section (96) which selects input data and category number corresponding to the group number and the category number which are large in the count number of the rejected correct-answer data counted by the rejected correct-answer data number counting section (95).

With this arrangement, when a non-learned evaluation data is entered, a recognition result of the input pattern is generated from the recognition result calculating section (13) and is displayed on the recognition result display section (18). When the recognition result is rejected regardless of its correctness, the group number having the maximum group attribution factor with respect to this evaluation data is selected by the first group number selecting section (92). The correct category group entered from the correct-answer input section (19) is memorized, together with this evaluation data, in the force learning data memory section (94). The rejected correct-answer data number counting section (95) counts the number of rejected correct-answer data in connection with each of group number and category number based on the data memorized in the force learning data memory section (94). Then, the first force learning candidate data selecting section (96) selects the data corresponding to the group number and the category number which are large in the count number of the rejected correct-answer data thus counted.

In this manner, providing the first force learning candidate data selecting section (96) makes it possible to perform the force learning operation chiefly or primarily on the fine classification sections or categories of the group numbers having low recognition ability without applying the force learning operation to all of the rejected correct-answer data. Hence, the efficiency of the force learning operation can be improved. Furthermore, providing the second group selecting section (10) is useful to apply the renewal of weight coefficients to only the limited number of fine classification sections (8) relating to the force learning pattern. Thus, it becomes possible to realize an excellent force learning operation which gives no adverse effect to the overall function of the recognition & judgement apparatus as well as the recognition ability of the already-learned data.

Furthermore, according to the features of the preferred embodiments of the present invention, it is desirable that the learning type recognition & judgement apparatus of the present invention further comprises: a reference data memory section (97) which memorizes reference data and a teacher signal used for evaluating a force learning result relating to the data selected by the first force learning candidate data selecting section (96); a force learning result acceptability judging section (98) which judges the acceptability of a force learning operation by evaluating a recognition result relating to the reference data; and a second force learning candidate data selecting section (99) which selects only force learning candidate data judged as acceptable in the force learning result acceptability judging section (98).

With this arrangement, the force learning candidate data is selected, the additional learning is applied to the group numbers and categories having low recognition ability. Upon every execution of the learning operation, the reference data is recognized to evaluate the result of each force learning operation. Based on the recognition result of this reference data, it is judged whether the result of the concerned force learning operation is acceptable or not. Then, only the force learning candidate data judged acceptable is selected by the second force learning candidate selecting section (99), and is subjected to the final force leaning operation.

In this manner, providing the force learning result acceptability judging section (98) and the second force learning candidate data selecting section (99) makes it possible to select the force learning candidate while confirming what kind of effect is given to the reference data which is the target data to be recognized by the present invention recognition & judgement apparatus. Thus, useless force learning data can be deleted and hence the efficiency of the force learning operation can be improved.

In this case, it is preferable that the force learning result acceptability judging section (98) judges the acceptability of the force learning operation based on a change of a sum of the number of rejected data and a multiple (integer not less than 1) of the number of erroneous reading data before and after the force learning operation.

Furthermore, it is preferable that the learning type recognition & judgement apparatus of the present invention further comprises: a first reject threshold control section (104) which generates two kinds of reject thresholds by adding and subtracting a constant value to and from a preset reject threshold; a second group number selecting section (105) which selects a group number having the maximum group attribution factor with respect to evaluation data; a recognition result accumulating section (106) which accumulates the number of erroneous reading and rejected data in connection with each of the selected group number and category based on a recognition result of the evaluation data; and a first reject threshold determining section (107) which determines a reject threshold in connection with group number or category based on a comparison in each of the group number or the category between an accumulation result with respect to a predetermined reject threshold and an accumulation result with respect to a reject threshold obtained after the above-described change.

With this arrangement, when a non-learned evaluation data is entered, the category similarity is calculated. The second group number selecting section (105) selects the group number having the maximum group attribution factor with respect to the input data. The recognition result calculating section (13) calculates the recognition result of the category similarity using a total of three kinds of reject thresholds, i.e. a predetermined reject threshold, and two kinds of reject thresholds obtained by adding and subtracting a constant value to and from this preset reject threshold generated by the first reject threshold control section (104). The recognition result accumulating section (106) accumulates the number of erroneous reading and rejected data in connection with each of these three kinds of reject thresholds based on the selected group number and category. The first reject threshold determining section (107) determines the reject threshold in connection with group number or category based on a comparison in each of the group number or the category between an accumulation result with respect to a predetermined reject threshold and an accumulation result with respect to a reject threshold obtained after the above-described change.

In this manner, providing the first reject threshold control section (104), the second group number selecting section (105), the recognition result accumulating section (106) and the reject threshold determining section (107) makes it possible to set the reject thresholds individually for each of the groups or categories and hence makes it possible to reduce the number of erroneous reading data and rejected data, thus enabling an effective reject processing.

Still further, according to the features of the preferred embodiments of the present invention, it is desirable that the learning type recognition & judgement apparatus of the present invention further comprises: a threshold change candidate selecting section (108) which selects at least one of group numbers or category numbers having a large difference between the number of erroneous reading data and the number of rejected data based on an accumulation result in the recognition result accumulating section (106), and a second reject threshold control section (109) which is substituted for the first reject threshold control section (104) to add or subtract a constant value to or from the reject threshold of the group or category based on the largeness relationship between the number of erroneous reading data and the number of rejected data in the selected group or category.

With this arrangement, when a non-learned evaluation data is entered, its category similarity and group number are selected. Then, recognition result is accumulated using the predetermined reject threshold.

The threshold change candidate selecting section (108) selects at least one of group numbers or category numbers having a large difference between the number of erroneous reading data and the number of rejected data based on the accumulation result. The second reject threshold control section (109) adds or subtracts the constant value to or from the reject threshold of the group or category based on the largeness relationship between the number of erroneous reading data and the number of rejected data in the selected group or category.

Using the accumulation result of the recognition result with respect to the reject threshold, the reject threshold determining section (107) determines the reject threshold in connection with group number or category based on a comparison in each of the group number or the category between an accumulation result with respect to a predetermined reject threshold and an accumulation result with respect to a reject threshold obtained after the above-described change.

In this manner, providing the threshold change candidate selecting section (108) and the second reject threshold control section (109) makes it possible to set the reject thresholds individually for the groups or categories having low recognition ability or poor reject performance, and hence makes it possible to reduce the number of erroneous reading data and rejected data with respect to these groups or categories, thus enabling an effective reject processing.

Yet further, it is desirable that the reject threshold determining section (107) adds a constant value to the reject threshold of the group or category when a sum of a multiple of an increased number of erroneous reading data and a reduced number of rejected data is less than a predetermined value, and subtracts a constant value from the rejected threshold of the group or category when a sum of a multiple of a reduced number of the erroneous reading data and an increased number of the rejected data is less than a predetermined value.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
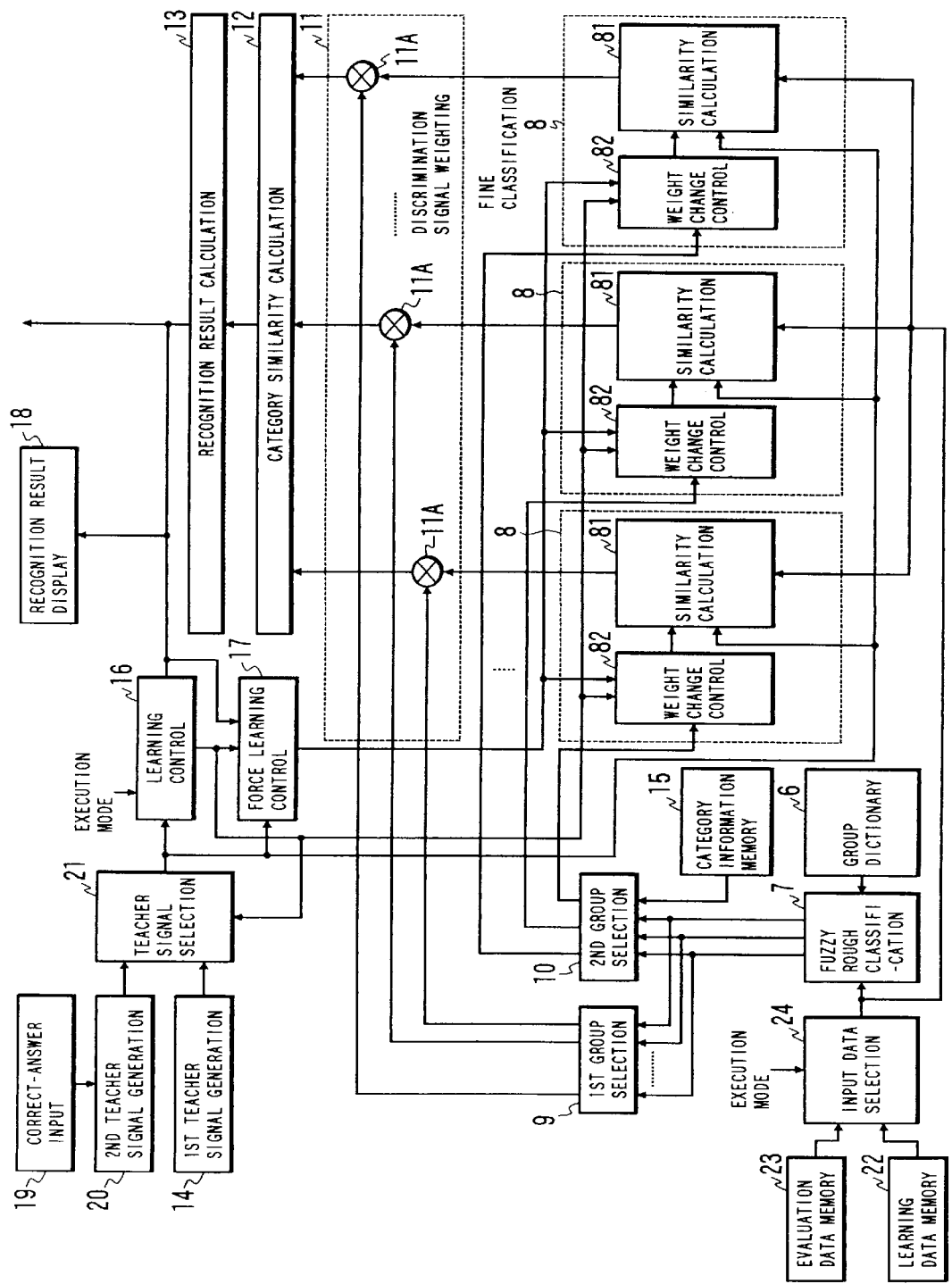
FIG. 1 is a schematic block diagram showing an arrangement of a learning type recognition & judgement apparatus in accordance with a first embodiment of the present invention.

Preferred embodiments of the present invention will be explained in greater detail hereinafter, with reference to the accompanying drawings. Identical parts are denoted by the same reference numerals throughout views.

Pattern data, generally input in a learning type recognition & judgement apparatus, comprise time series pattern data such as speech or voice and space pattern data such as characters and images. The embodiments of the present invention are applicable to either of these pattern data.

FIG. 1 is a schematic block diagram showing an arrangement of a learning type recognition & judgement apparatus in accordance with a first embodiment of the present invention. In FIG. 1, reference numeral 6 represents a group dictionary section which memorizes a plurality of group reference pattern signals representative of category groups which consist of sets of similar patterns of input pattern signals. Reference numeral 7 represents a fuzzy rough classification section which calculates group attribution factors of each input pattern signal with reference to the group reference pattern signals memorized in group dictionary section 6. Each group attribution factor represents an attribution degree of the input pattern signal to each category group.

Reference numeral 8 represents a fine classification section which comprises a similarity calculating section 81 and a weight change amount control section 82. Similarity calculating section 81 calculates an in-group similarity which is a degree of similarity of each input pattern signal with respect to each category involved in the same category group. Weight change amount control section 82 controls the weight change amount of an associated similarity calculating section 81 in accordance with an output of a second group selecting section 10 later-described. Reference numeral 9 represents a first group selecting section, which selects a plurality of category groups based on the group attribution factors.

Second group selecting section 10 selects at least one group attribution factor among larger group attribution factors in the fine classification sections, which comprise the category of the input pattern signal, based on the category information memorized in a category information memory section 15 later-described. Reference numeral 11 represents a discrimination signal weighting section which weights the in-group similarities obtained by fine classification sections 8 based on the group attribution factors of the category groups selected by first group selecting section 9. In discrimination signal weighting section 11, reference numeral 11A represents a multiplier which multiplies the group attribution factor of the category group selected by first group selecting section 9 with the in-group similarity obtained in the fine classification section 8 corresponding to this group attribution factor.

Reference numeral 12 represents a category similarity calculating section which adds multiplication results of plural multipliers 11A about each category to obtain a category similarity which is a belonging degree to each category.

Reference numeral 14 represents a first teacher signal generating section which generates a teacher signal required to renew (i.e. to learn) the weight value in each fine classification section 8. Reference numeral 15 represents the category information memory section, which memorizes the category information belonging to each fine classification section 8. Reference numeral 16 represents a learning control section which controls the weight value change in each weight change amount control section 82 in accordance with a comparison between the discrimination result of a recognition result calculating section 13 and the category number of the input pattern outputted from first teacher signal generating section 14. Reference numeral 17 represents a force learning control section which controls the learning operation in each fine classification section 8, when a recognition result of a non-learned pattern is a rejected correct answer, until a reject judge value of this pattern is reduced below a predetermined threshold.

Reference numeral 18 represents a recognition result display section which generates a recognition result discriminated by recognition result calculating section 13 to a display unit. Reference numeral 19 represents a correct-answer input section which inputs a correct recognition result when the recognition result is rejected regardless of its correctness. Reference numeral 20 represents a second teacher signal generating section which converts an entered correct recognition result into a teacher signal which is a category number corresponding to the input data. Reference numeral 21 represents a teacher signal selecting section which switches an output of first teacher signal generating section 14 and an output of second teacher signal generating section 20 in accordance with an execution mode.

Reference numeral 22 represents a learning data memory section for memorizing initial learning data. Reference numeral 23 represents an evaluation data memory section which memorizes data used for evaluating the initial learning results. Reference numeral 24 represents an input data selecting section for switching the above-described input data in accordance with an execution mode.

Figure 2:
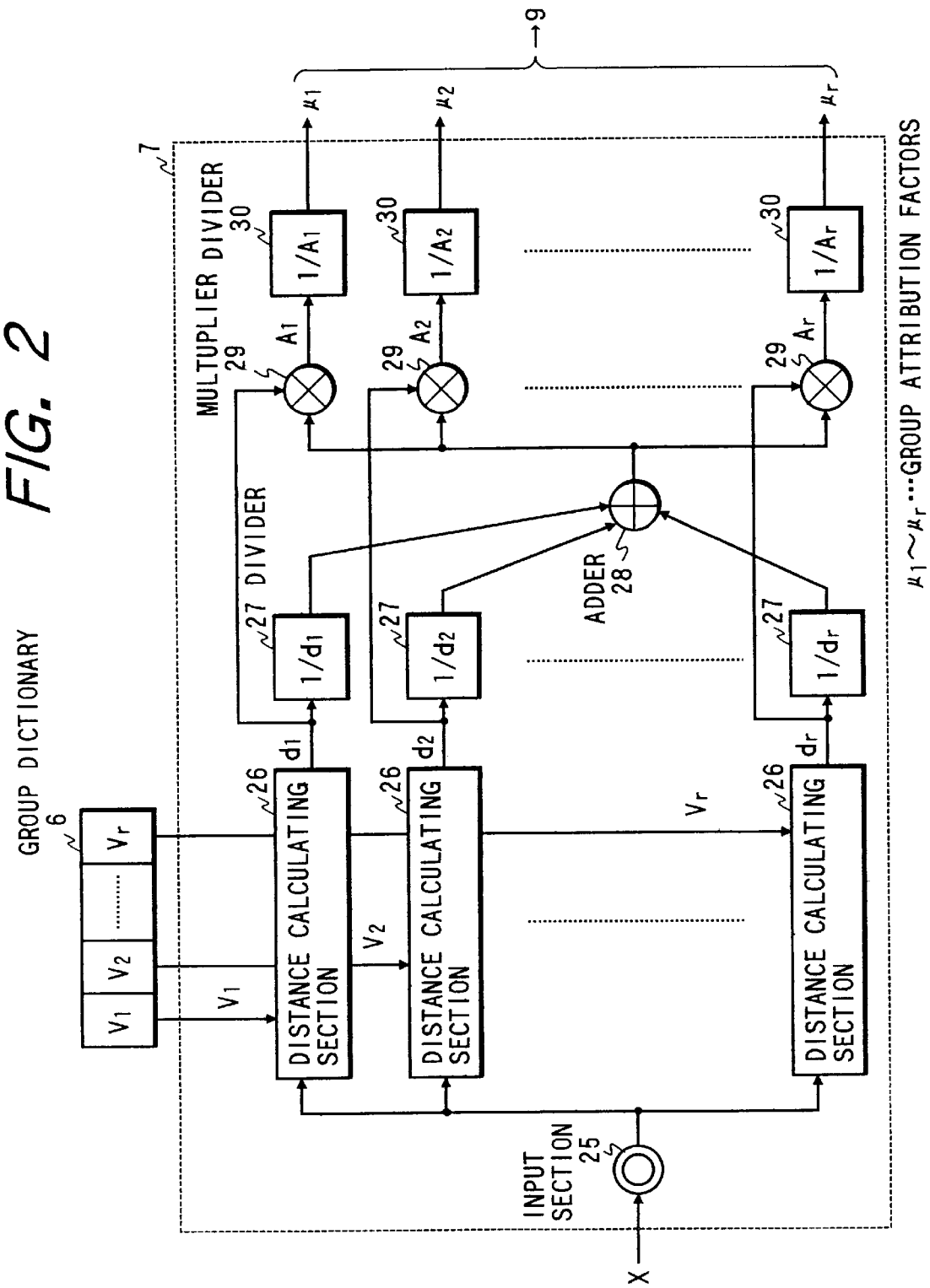
FIG. 2 is a schematic block diagram showing an arrangement of an example of a fuzzy rough classification section in the first embodiment of the present invention.

FIG. 2 is a schematic block diagram showing a detailed arrangement of fuzzy rough classification section 7 shown in FIG. 1. In FIG. 2, reference numeral 25 represents an input section which receives an input pattern signal X. Reference numeral 26 represents a distance calculating section. There are provided a total of "r" distance calculating sections 26—26 for calculating distances between input pattern signal X and all of group reference pattern signals $V_1$, $V_2$, - - -, $V_r$. Reference numeral 27 represents a divider. There are provided a total of "r" dividers 27—27 for obtaining inverses or reciprocals of "r" outputs generated from distance calculating sections 26—26. Reference numeral 28 represents an adder which obtains a sum of all the outputs of dividers 27—27. Reference numeral 29 represents a multiplier. There are provided a total of "r" multipliers 29—29 for multiplying an output of adder 28 with each of "r" outputs of distance calculating sections 26—26. Reference numeral 30 represents a divider. There are provided a total of "r" dividers for obtaining inverses or reciprocals of "r" outputs of multipliers 29—29.

Figure 3:
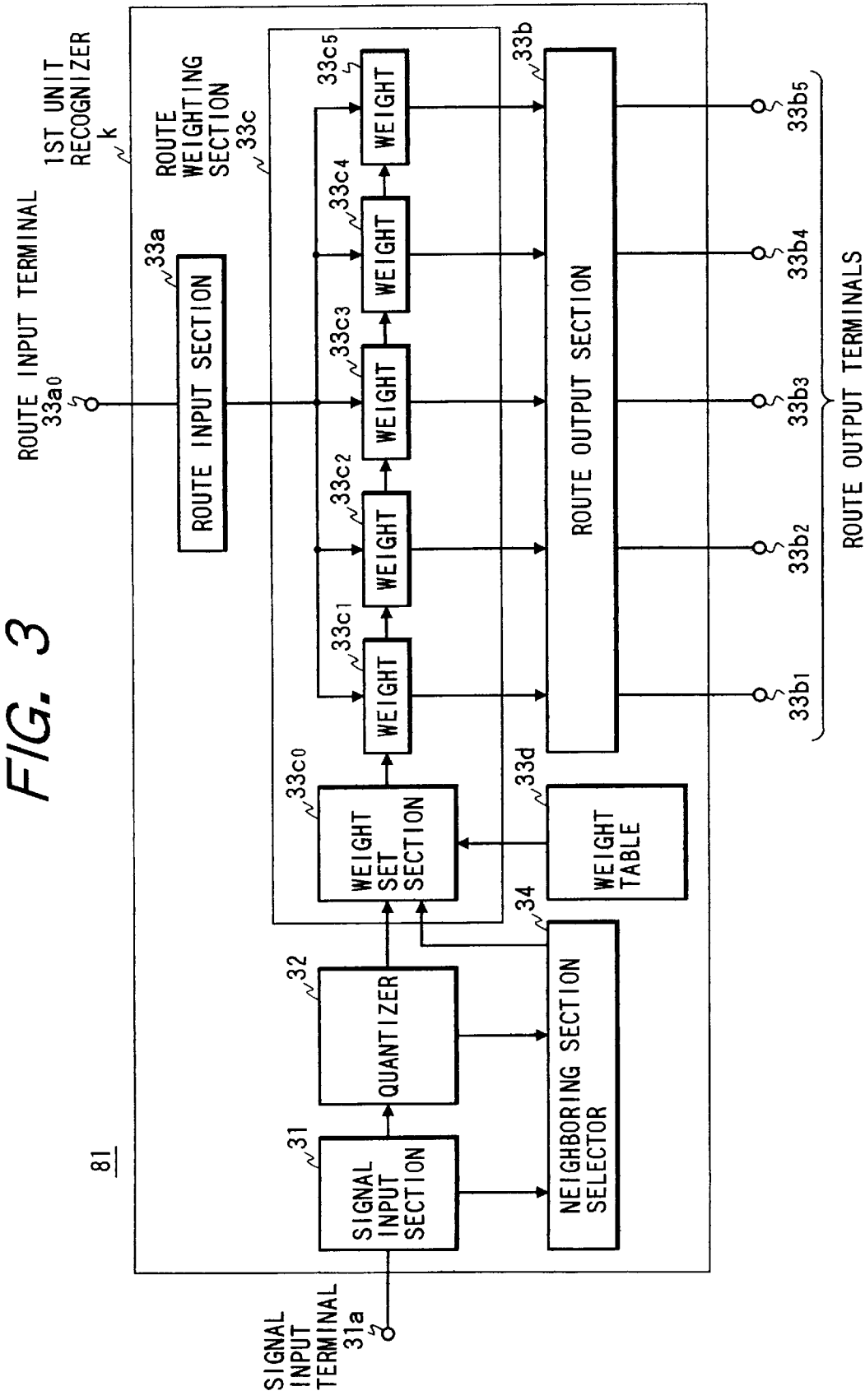
FIG. 3 is a schematic block diagram showing an arrangement of a first unit recognizer in a similarity calculating section in accordance with the first embodiment of the present invention.

FIG. 3 is a schematic block diagram showing an arrangement of a first unit recognizer k provided in each similarity calculating section 81 shown in FIG. 1. In FIG. 3, reference numeral 31 represents a signal input section which receives feature data, i.e. an object to be recognized and judged, through a signal input terminal 31a. Signal input section 31 sends the entered feature data to a quantizer 32. Quantizer 32 quantizes the entered feature data and generates a value representing a quantized level. This quantized level is sent to both a route weighting section 33c and a neighboring section selector 34. Neighboring section selector 34 selects neighboring quantized sections of the quantized section corresponding to the input signal (i.e. feature data).

Reference numeral $33a_0$ represents a route input terminal. Reference numerals $33b_1$ to $33b_5$ represent route output terminals. When a network is constituted by the combination of a plurality of unit recognizers, these terminals are appropriately connected.

Route weighting section 33c comprises a weight set section $33c_0$ and a plurality of weights $33c_1$ through $33c_5$. Each weight $33c_1$–$33c_5$ is interposed between a route input section 33a and a route output section 33b. Weight set section $33c_0$ selects an appropriate weight value from the data memorized in a later-answer weight table 33d in accordance with the quantized result and sets the selected weight value to each of weights $33c_1$ to $33c_5$.

Weight table 33d memorizes the weight value corresponding to the quantized section of each input signal and weight values corresponding to its neighboring quantized section. Weight set section $33c_0$ in the route weighting section 33c sets the weight value at a position corresponding to each quantized section based on the quantized result. Each of weights $33c_1$ to $33c_5$ weights the route signal entered from route input section 33a. Route output section 33b sends thus weighted route signals to route output terminals $33b_1$ to $33b_5$.

Figure 4:
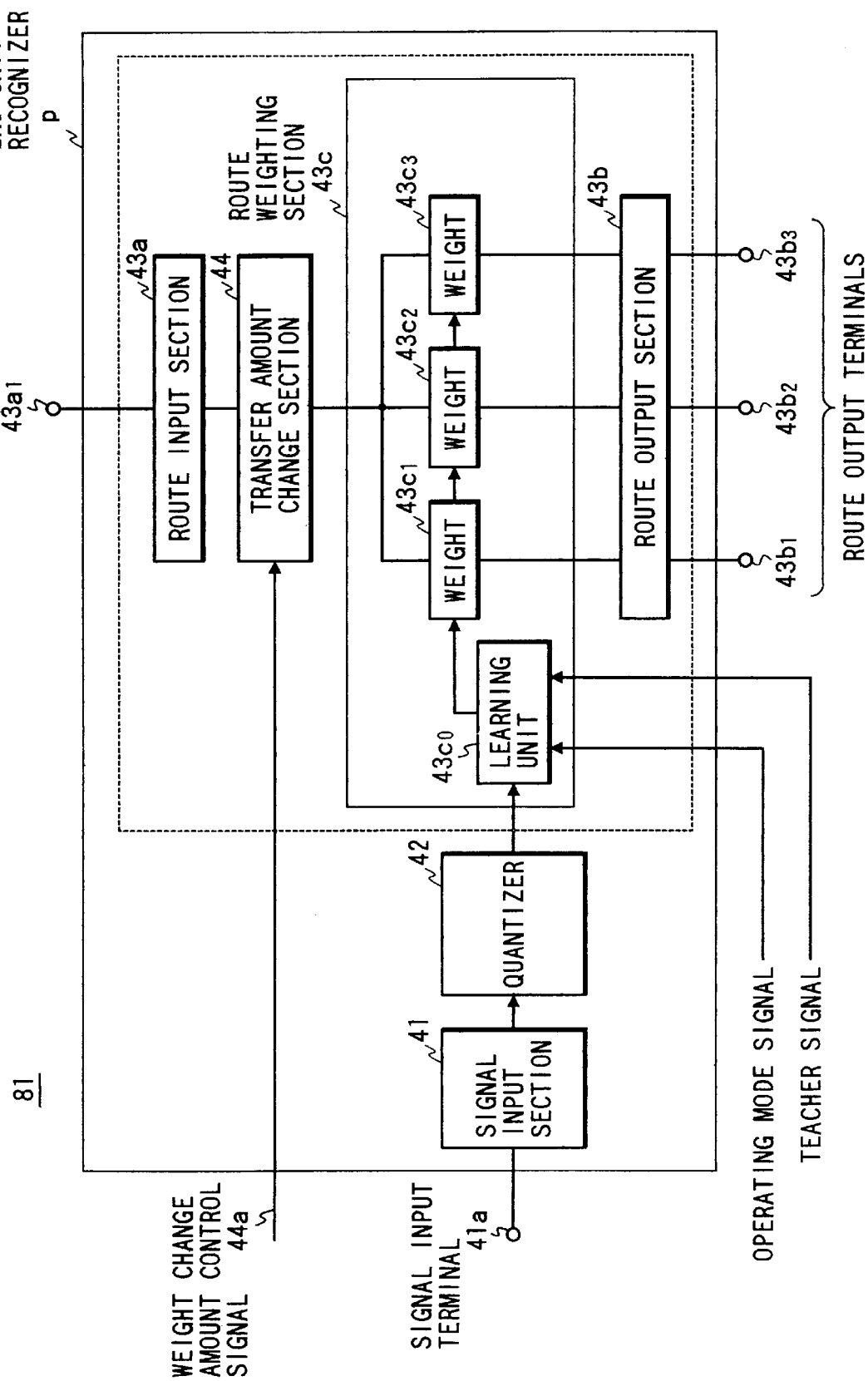
FIG. 4 is a schematic block diagram showing an arrangement of a second unit recognizer in the similarity calculating section in accordance with the first embodiment of the present invention.

FIG. 4 is a schematic block diagram showing an arrangement of a second unit recognizer p which constitutes a previous or preceding layer of the lowest layer of the network in the similarity calculating section 81 shown in FIG. 1. Like the first unit recognizer k shown in FIG. 3, the second unit recognizer p comprises a signal input section 41 having a signal input terminal 41a, a quantizer 42, a route input section 43a having a single route input terminal $43a_1$, a route output section 43b having a total of three route output terminals $43b_1$ to $43b_3$, a transfer amount change section 44 shifts a transmission value by n bits in response to a weight change amount control signal 44a when the transmission value is entered from route input terminal $43a_1$ of route input section 43a, and a route weighting section 43c.

Weights $43c_1$ to $43c_3$ of route weighting section 43c serve as weighting factors added or applied on route output signals to be outputted from route output terminals $43b_1$ to $43b_3$ of route output section 43b. In the procedure of the weight change processing, a learning unit $43c_0$ renews the weight between route input terminal $43a_1$ and any one of route output terminals $43b_1$ to $43b_3$ indicated by an output of quantizer 42 in accordance with an output value of transfer amount change section 44. In the procedure of the forward processing, no signal is entered into quantizer 42. Hence, weights $43c_1$ to $43c_3$ respectively give weight to the signal generated from transfer amount change section 44, and the route output section 43b sends out thus weighted route signals to route output terminals $43b_1$ to $43b_3$.

Figure 5:
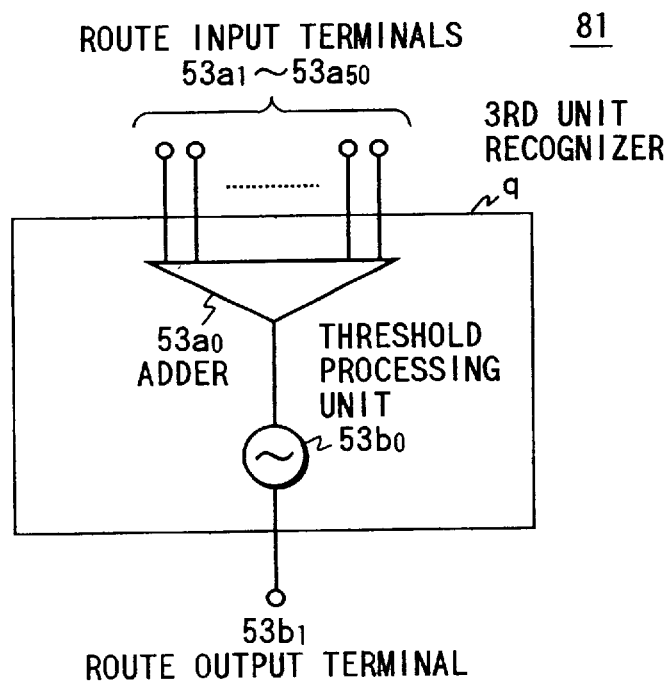
FIG. 5 is a schematic block diagram showing an arrangement of a third unit recognizer in the similarity calculating section in accordance with the first embodiment of the present invention.

FIG. 5 is a schematic block diagram showing an arrangement of a third unit recognizer q constituting the lowest layer of the network in each similarity calculating section 81 shown in FIG. 1. In FIG. 5, reference numeral $53a_0$ represents an adder for adding input signals entered through a plurality of route input terminals $53a_1$ to $53a_{50}$. Reference numeral $53b_0$ represents a threshold processing unit for processing the route signal, i.e. an output of adder $53a_0$, by a given threshold.

Figure 6:
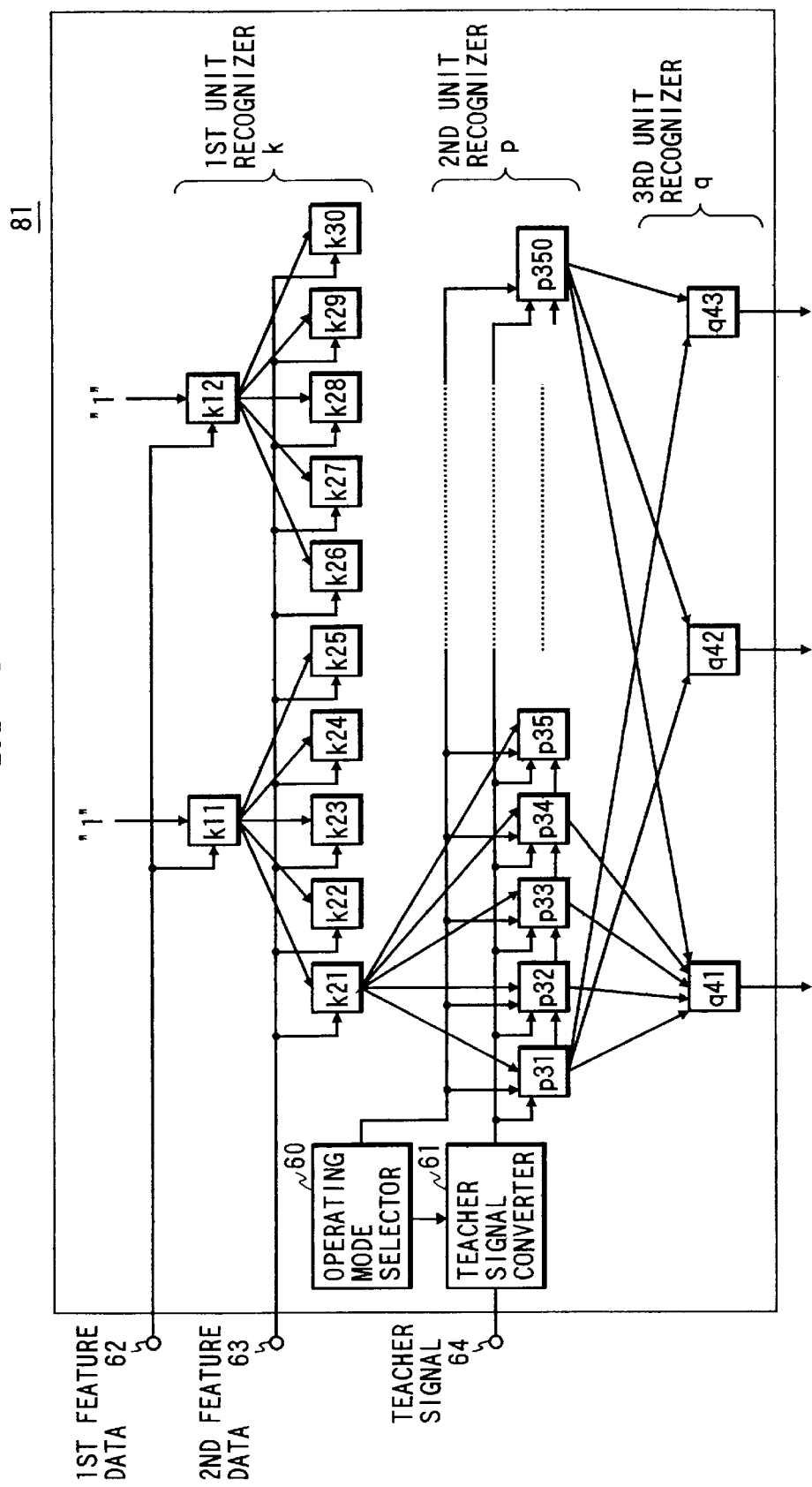
FIG. 6 is a schematic block diagram showing an overall arrangement of the similarity calculating section in accordance with the first embodiment of the present invention.

FIG. 6 is a schematic block diagram showing an overall arrangement of the similarity calculating section 81 shown in FIG. 1, which consists of the first to third unit recognizers k, p and q disclosed in FIGS. 3 through 5.

In the example of this embodiment, three kinds of categories are recognized based on two different kinds of feature data, i.e. first feature data and second feature data. Two tree branch structures are provided by combining a plurality of unit recognizers. One tree branch structure is a four-level hierarchy network comprising a total of four layers. Unit recognizers k11-k12 and k21-k30, which are respectively first unit recognizer k shown in FIG. 3, cooperatively constitute first and second layers. Unit recognizers p31-p350, which are respectively second unit recognizer p shown in FIG. 4, cooperatively constitute a third layer. Unit recognizers q41, q42 and q43, which are respectively third unit recognizer q shown in FIG. 5, cooperatively constitute a fourth layer.

The first feature data to be judged is input through a common signal input terminal 62 to the first unit recognizers k11 and k12 constituting the first layer. The second feature data to be judged is input through a common signal input terminal 63 to the first unit recognizers k21-k30 constituting the second layer. A teacher signal, which is an input data effective only in the weight change processing, is input through a common signal input terminal 64 to the second unit recognizers p31-p350 constituting the third layer.

Reference numeral 60 represents an operating mode selecting section which switches the operating mode by outputting a weight change signal and a forward processing mode signal. Reference numeral 61 represents a teacher signal converting section which converts the teacher signal generated from first teacher signal generating section 14 into the number of its corresponding unit recognizer q of the lowest layer.

An operation of the learning type recognition & judgement apparatus in accordance with the first embodiment of the present invention will be explained.

The operation modes in this embodiment includes an initial learning mode and a force learning mode.

First of all, the initial learning mode will be explained. Input data selecting section 24 selects a data from learning data memory section 22 and sends a learning pattern signal X to fuzzy rough classification section 7 and each of fine classification sections 8.

Learning pattern signal X, consisting of n feature data representing the object to be recognized, is expressed by the following equation 7.

$$X=(x_1, x_2, \cdots, x_n) \tag{7}$$

This input pattern signal X is first input to fuzzy rough classification section 7. More specifically, as shown in FIG. 2, the input pattern signal X is entered through input section 25 and sent to each of a total of "r" distance calculating sections 26—26. Each distance calculating section 26 reads out a group reference pattern signal $V_i$ ($1 \leq i \leq r$; r is the number of the group reference pattern signal, i.e. category group number) from group dictionary 6. Each group reference pattern signal $V_i$ is representative of each category group. Then, distance calculating section 26 calculates a distance $d_i$ between X and $V_i$ according to the following equation 8.

$$d_i = \|X - V_i\|^{2/(f-1)} \tag{8}$$

where $1 \leq i \leq r$, and f is a real number satisfying a relation f>1.

The distance $d_i$, thus calculated in each distance calculating section 26, is sent to a corresponding divider 27 and a corresponding multiplier 29.

Each divider 27 calculates a reciprocal of distance $d_i$. Thus obtained reciprocal of $d_i$ is sent to adder 28. Adder 28 obtains a sum of all the outputs of r dividers 27. Thus obtained sum is outputted to each of r multipliers 29. Each multiplier 29 multiplies the output of an associated distance calculating section 26 with the output of the adder 28. The result of this multiplication is entered into a corresponding divider 30. Each divider 30 obtains a reciprocal of the output of its corresponding multiplier 29. An output of each divider 30 is a group attribution factor $\mu_i$ ($1 \leq i \leq r$) of each category group with respect to the entered learning pattern signal X. In other words, fuzzy rough classification section 7 finally generates these group attribution factors $\mu_1 - \mu_r$ to the first group selecting section 9. The group attribution factor $\mu_i$ ($1 \leq i \leq r$) of each category group is expressed by the following equation 9.

$$\mu_i = 1 \bigg/ \left\{ \sum_{k=1}^{r} (d_i / d_k) \right\} \tag{9}$$

The group reference pattern signals, representing category groups and memorized in group dictionary 6, can be set beforehand by using the conventional clustering method, such as the K mean algorithm disclosed in "Pattern Information Processing" by S. Nagao, Institute of Electronic Information & Communication, or the Isodata algorithm, or the LBG algorithm disclosed in "An Algorithm for Vector Quantizer Design," IEEE Trans. Commun., COM-28, 1, pp. 84–95, January 1980.

Hereinafter, the method of setting group dictionary 6 using the K mean algorithm will be explained simply.

(1) A total of "r" (r represents a predetermined category group number) pattern signals are selected from the set of pattern signals for designing the group dictionary of the recognition object. These selected pattern signals are designated as r group reference pattern signals $V_i$ ($1 \leq i \leq r$).

(2) With respect to each pattern signal X used for designing the group dictionary, obtained is a specific value of $V_i$ for minimizing the distance $d_i$ defined by the following equation 10.

$$d_i = \|X - V_i\| \tag{10}$$

where X belongs to a category group $S_i$ ($1 \leq i \leq r$).

(3) A mean value of pattern signal X belonging to each $S_i$ is obtained and designated as $V_i'$.

(4) If a relation $V_i' = V_i$ is established with respect to each "i", these selected group reference pattern signals $V_i$ are memorized in group dictionary 6. If the above relation is not established, the group reference pattern signal $V_i$ is replaced by $V_i'$, then the procedure returning to (2).

By setting the group reference pattern signals in this manner, all of pattern signals can be classified into some partial sets (category groups) each consisting of similar pattern signals. In this respect, the above-described Isodata algorithm method and LBG algorithm are basically the same as the K mean algorithm.

First group selecting section 9 selects a plurality of category groups in order of largeness of the group attribution factor obtained in fuzzy rough classification section 7 (non-elected group attribution factors are reduced to "0"). And, these selected plural category groups are sent to discrimination signal weighting section 11. As an alternative method of selecting category groups, it will be possible to select only the category groups having group attribution factors larger than a predetermined threshold.

Hereinafter, an operation of similarity calculating section 81 will be explained in a case where learning pattern signals are four-dimensional vector data comprising two-dimensional first feature data and two-dimensional second feature data which are classified into three kinds of categories.

A route signal "1" is always given to the route input terminals of unit recognizers k11 and k12 constituting the first layer of the tree branch structure in each similarity calculating section 81 shown in FIG. 6. Signal input terminals 62 and 63 receive the first and second feature data to be judged. Signal input terminal 64 receives a teacher signal serving as an input data only effective in the weight change processing.

First, operating mode selecting section 60 generates a forward processing mode signal to teacher signal converting section 61. The learning pattern signal is divided into the first feature data and the second feature data which are respectively entered into the signal input terminal 31a of the corresponding first- or second-layer unit recognizer k shown in FIG. 3.

Each of first-layer unit recognizers k11 and k12 enters the first feature data through its signal input section 31 and quantizes the first feature data in its quantizer 32. The quantized result is sent to weight set section $33c_0$ and neighboring section selector 34. Neighboring section selector 34 selects quantized sections neighboring the quantized section of the input signal (i.e. feature data), and sends the selected quantized sections to route weighting section 33c. Weight set section $33c_0$ reads out the above-described preset weight value corresponding to the input data and the weight values corresponding to the neighboring sections from weight table 33d. And, weight set section $33c_0$ sets the readout weight values at the corresponding quantized levels. In this manner, one unit recognizer selects a plurality of routes. A plurality of multiplication results, each being a multiplication result of the route signal and the above-described weight value, are sent out to route input terminals of the second-layer unit recognizers k21 to k30 shown in FIG. 6.

The signal input terminal 63 common to each of second-layer unit recognizers receives the above-described second feature data. (In this case, two second feature data are entered into unit recognizers k21–k25 and k26–k30 respectively.) In the same manner as in the first-layer unit recognizer, a plurality of route signals are selected in each second-layer unit recognizer and a plurality of multiplication results, each being a multiplication result of the route signal and the weight value, are sent out to the route input terminals of the third-layer unit recognizers p31 to p350.

In the forward processing mode, no teacher input signal is entered into the signal input terminal of the third-layer unit recognizers p31 to p350. Accordingly, no weight is changed and hence the weight values are maintained at the same levels as those in the learning condition. These weight values are multiplied with the route input signal of each unit recognizer, and the multiplied results are sent to the fourth-layer unit recognizers q.

Next, as shown in FIG. 5, in each of the fourth-layer unit recognizer q, adder $53a_0$ adds the entered route signals. Threshold processing unit $53b_0$ processes the output of adder $53a_0$ by a given threshold and sends out its threshold processing result to route output terminal $53b_1$. The function preferable for the threshold processing is, for example, the sigmoid function or the step function.

In this manner, on the basis of the feature data of the entered pattern signal, an output of each final-layer unit recognizer is calculated using the weight values at that time. This output value is sent to the discrimination signal weighting section 11 shown in FIG. 1 as an in-group similar vector of each category with respect to the learning pattern signal X.

In discrimination signal weighting section 11, each multiplier 11A multiplies the group attribution factor $\mu_i$ of a category group selected in the first group selecting section 9 with the in-group similarity vector $(v_1, v_2, \text{---}, v_c)$ obtained from the fine classification section 8 corresponding to the selected category group. The output of each multiplier 11A is sent to category similarity calculating section 12. More specifically, the total number of multipliers 11A prepared in the discrimination signal weighting section 11 is equivalent to the multiplication value of (number of group reference pattern signals)×(sum of category reference pattern signals in each fine classification section). The output $\xi_{pq}$ of multiplier 11A is expressed by the following equation 11, when this multiplier 11A receives a group attribution factor $\mu_p$ of a certain category group p ($1 \leq p \leq r$; is the total number of category groups) selected by first group selecting section 9 and an in-group similarity $v_{pq}$ of the a certain category group q ($1 \leq q \leq c$; c is the total number of categories belonging to the category group) obtained from the fine classification section 8 corresponding to the above category group p.

$$\xi_{pq} = \mu_p \cdot v_{pq} \tag{11}$$

Category similarity calculating section 12 receives the outputs of all multipliers 11A and obtains a sum of selected output values in relation with each category as a category similarity $r_s$ ($1 \leq s \leq N_C$; $N_C$ is the total number of categories). Recognition result calculating section 13 selects two categories having the most-largest category similarity and the second-largest category similarity respectively. When a ratio of these two is smaller than a predetermined threshold, the category number of the category having the most-largest category similarity is outputted as a recognition result. When the ratio of these two is larger than the threshold, it is judged that no recognition is feasible and therefore a reject signal is outputted.

First teacher signal generating section 14 is in synchronism with the learning pattern signal X and generates a category number corresponding to the category of this learning pattern signal X. The category number is then sent from first teacher signal generating section 14 to both learning control section 17 and similarity calculating section 81 in each fine classification section 8.

Learning control section 16 compares the discrimination result with respect to the learning pattern signal X calculated in the above-described manner with the category of the learning pattern signal X. When the compared data agree with each other, weight renewal is not performed in each fine classification section 8 and the learning operation of the next learning pattern is performed. When the comparison does not meet, the weight values in fine classification sections 8 are renewed.

In the renewal of weight values, second group selecting section 10 selects a plurality of category groups having larger group attribution factors in the fine classification sections 8 comprising categories of the input pattern based on the category information memorized in the category information memory section 15. The selected plural category groups are sent to weight change amount control section 82.

Each weight change amount control section 82 renews the weight values in the associated similarity calculating section 81 in accordance with the selected group attribution factors, in the following manner. Namely, the weight change processing mode signal is sent out from the operating mode selecting section 60 to the teacher signal converting section 61 as shown in FIG. 6. Teacher signal converting section 61 converts the category number generated from the first teacher signal generating section 14 into a signal identifying a specific one of final-layer unit recognizers q41, q42 and q43 which should generate the most-largest output value in the above-described selected category group. This signal is sent to the signal input terminal 41a of the third-layer unit recognizer q shown in FIG. 4.

Quantizer 42 shown in FIG. 4 of unit recognizer units p31 to p350 shown in FIG. 6 sets a quantized level to a value corresponding to a route for a unit recognizer p41 when this unit recognizer p41 generates the largest output.

Weight change amount control section 82 changes the bit shift amounts of transfer amount change section 44 shown in FIG. 4 in accordance with the above-described selected group attribution factor. For example, the change of bit shift amounts is carried out in such a manner that, among the plural fine classification sections 8 selected by the second group selecting section 10, a bit shift amount of "0" is set for the fine classification section 8 having the most-largest group attribution factor while a bit shift amount of "1" is set for the fine classification section 8 having the second-largest group attribution factor.

Learning unit $43c_0$ increases the value of weight $43c_1$ by an amount equivalent to an output of transfer amount change section 44. Weight $43c_1$ is a linkage intensity between the route input terminal $43a_1$ of route input section 43a and a route output terminal (route $43b_1$ connected to unit recognizer q41 in this case) of route output section 43b indicated by an output of quantizer 42.

Figure 7:
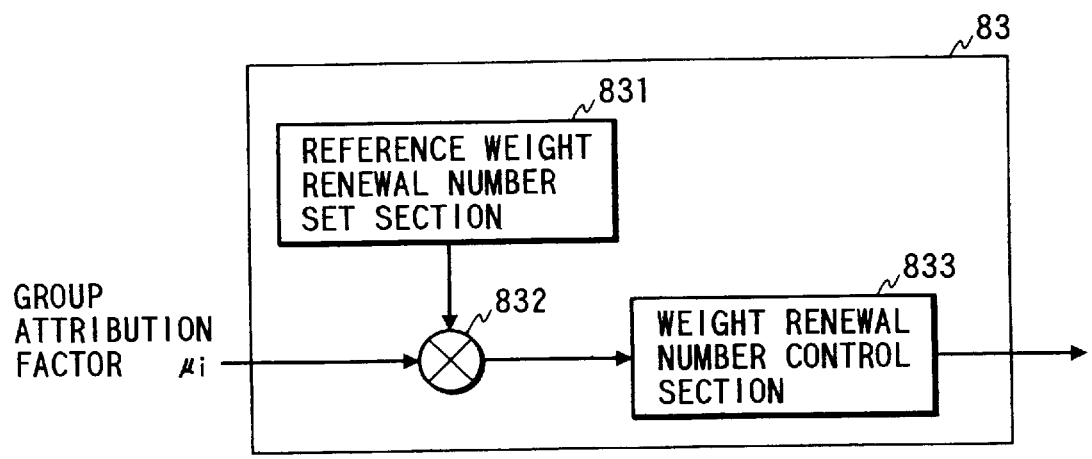
FIG. 7 is a schematic block diagram showing another arrangement of a weight change amount control section in FIG. 1.

FIG. 7 is a schematic block diagram showing another arrangement of the weight change amount control section. The weight change amount control section 83 comprises a reference weight renewal number set section 831 which sets a reference value for the weight value renewal number, a multiplier 832 which multiplies the reference value for the weight value renewal number generated from reference weight renewal number set section 831 with a corresponding group attribution factor $\mu_i$ among the group attribution factors selected by second group selecting section 10, and a weight renewal number control section 833 which controls the total number of weight renewals executed by learning unit $43c_0$ of similarity calculating section 81 based on the multiplication result in the multiplier 832. Thus, weight renewal number control section 833 repeats the weight renewal processing in the same manner as the previously described manner on the basis of the weighted value obtained by multiplying the reference value for the weight value renewal number being set in advance by the reference weight renewal number set section 831 with the selected group attribution factor.

The above-described learning operation is repeated until the discrimination result of recognition result calculating section 13 meets the teacher signal generated from first teacher signal generating section 14 with respect to all of the input data. Through this repetitive learning operation, the recognition of the learning pattern in accordance with the first embodiment can be accomplished.

As described above, according to the first embodiment apparatus, when the discrimination result to a certain learning pattern signal is erroneous, the second group selecting section 10 selects a plurality of category groups having larger attribution factors with respect to that pattern. The fine classification sections 8 corresponding to these selected category groups perform learning operation cooperatively by adjusting their weight change amounts with reference to attribution factors of the learning pattern to their category groups. Hence, it becomes possible to accurately learn the pattern positioned near the boundary of the category group, increasing the recognition rate.

Furthermore, in the step of the weight change processing in each similarity calculating section 81, the weight values of only the second unit recognizers constituting the third layer are learned by learning unit $43c_0$ by simply increasing the weight values by an amount equivalent to the output from the transfer amount change section 44. In other word, there is no need of changing the weight value of all layers, thereby making it possible to realize a speedy learning operation.

Next, the force learning operation will be explained.

When a force learning mode, as an execution mode, is entered into learning control section 16 and input data selecting section 24, the input data selecting section 24 selects the output of evaluation data memory section 23 and non-learned evaluation data is sent to fuzzy rough classification section 7 and fine classification sections 8. When a non-learned pattern is entered, recognition result calculating section 13 generates a discrimination result with respect to the learning pattern signal X in the same manner as in the initial learning mode. The discrimination result is displayed on the recognition result display section 18.

When the recognition result is a reject judgement regardless of its correctness, second teacher signal generating section 20 generates a category number corresponding to a category of the input data in response to an entry of a correct recognition result with respect to the category of the input data which is entered through correct-answer input section 19 such as a keyboard. Teacher signal selecting section 21 selects the output of second teacher signal generating section 20 when the executed mode is the force learning mode, and sends the selected output to each similarity calculating section 81 and force learning control section 17.

Force learning control section 17 is controlled to repeat the learning operation in the same manner as the initial learning mode until the reject judge value of the rejected correct-answer data is reduced below a predetermined reject threshold based on the recognition result of the entered correct answer. Through this repetitive learning operations by force learning control section 17, it is surely prevented that the recognition result is rejected regardless of its correctness.

As it is feasible to perform a force learning operation of the rejected correct-answer pattern, it becomes possible to reduce the rejected correct-answer pattern, increasing the correct reading pattern and improving the recognition ability.

Furthermore, as the renewal of weight values is limited to only the fine classification sections 8 relating to the force learning pattern, the force learning operation gives no adverse effect to the overall function of the recognition & judgement apparatus. Thus, it becomes possible to realize a force learning operation which gives no adverse effect to the recognition ability of the already-learned data.

Second Embodiment

Figure 8:
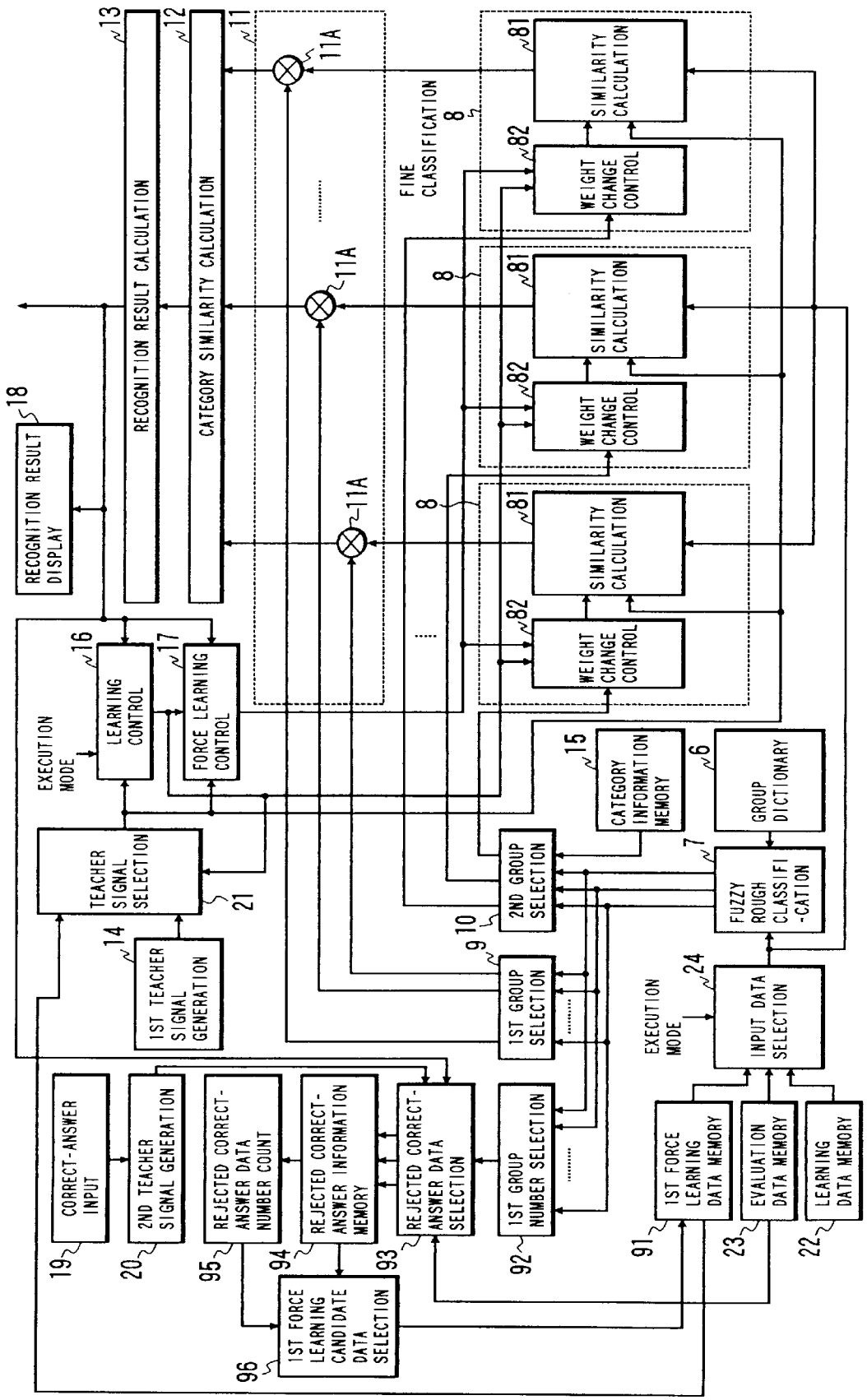
FIG. 8 is a schematic block diagram showing an arrangement of a learning type recognition & judgement apparatus in accordance with a second embodiment of the present invention.

FIG. 8 is a schematic block diagram showing an arrangement of a learning type recognition & judgement apparatus in accordance with a second embodiment of the present invention. In the explanation of the following embodiments, a component already explained is denoted by the same reference numeral and will be no more explained.

The arrangement of the second embodiment is different from that of the first embodiment in that the second embodiment comprises a first force learning data memory section 91 which memorizes additional learning data selected from evaluation data and the teacher signals, a first group number selecting section 92 which selects the group number having the most-largest group attribution factor with respect to the evaluation data, a rejected correct-answer data selecting section 93 which generates the evaluation data, the category number and the group number selected by first group number selecting section when the recognition result is a rejected correct-answer in the judgement based on the recognition result of the evaluation data and the output of second teacher signal generating section 20 which is a category number of the evaluation data, a rejected correct-answer information memory section 94 which receives and memorizes the evaluation data, the category number and the group number generated from rejected correct-answer data selecting section 93, a rejected correct-answer data number counting section 95 which counts the number of rejected correct-answer data in connection with each of group number and category number based on the information memorized in the rejected correct-answer information memory section 94, and a first force learning candidate data selecting section 96 which selects the rejected correct-answer data and the category number corresponding to the group number and the category number which are large in the count number of the rejected correct-answer data and sends the rejected correct-answer data thus selected and the category number to the first force learning data memory section 91.

An operation of the above-described second embodiment will be explained hereinafter. The operating mode of the second embodiment is separated into an initial learning mode, an evaluation mode and a force learning mode. The initial learning mode is performed in the same manner as in the first embodiment.

Next, the operation of the evaluation mode will be explained. The evaluation mode is a mode for evaluating the performance of the above-described initial learning mode by using evaluation data different from the learning pattern.

Input data selecting section 24 selects the output of evaluation data memory section 23 and the selected evaluation pattern signal is sent to fuzzy rough classification section 7 and each fine classification section 8. The recognition result with respect to the evaluation pattern signal is calculated in the same manner as in the initial learning mode, and this recognition result is displayed on the display unit through recognition result display section 18 and also sent to rejected correct-answer data selecting section 93. In the case where the recognition result displayed on the display unit is rejected although it is a correct answer, a correct answer is entered through correct-answer input section 19. And, second teacher signal generating section 20 converts the entered correct answer into a teacher signal which is a category number of the entered correct answer. The converted teacher signal is sent to rejected correct-answer data selecting section 93.

First group number selecting section 92 selects the group number having the most-largest group attribution factor with respect to the evaluation pattern signal and sends the selected group number to rejected correct-answer data selecting section 93. The rejected correct-answer data selecting section 93 judges the recognition result based on the recognition result of the evaluation pattern and the category number, and reads out its evaluation pattern data from evaluation data memory section 23 when the judgement result is a rejected correct-answer, and sends the readout evaluation pattern data together with the category number and the group number of the readout pattern to rejected correct-answer information memory section 94.

Rejected correct-answer data number counting section 95 counts the number of rejected correct-answer data in connection with each of group number and category number based on the information memorized in the rejected correct-answer information memory section 94. Based on the counting result, the first force learning candidate data selecting section 96 selects evaluation pattern data and category number corresponding to the group number and category number which are large in the count number of the rejected correct-answer data, and sends them to the first force learning data memory section 91.

As described above, according to the second embodiment apparatus, the force learning operation is not applied to all of rejected correct-answer data relating to the evaluation data. Instead, the fine classification sections or categories corresponding to the group numbers having lower recognition ability (i.e. having a large number of rejected correct-answer data) are chiefly or primarily selected and applied the force learning operation. Hence, it becomes possible to increase the efficiency of the force learning operation.

Next, the force learning mode will be explained. The force learning mode is a mode for performing the force learning operation using the data memorized in first force learning data memory section 91 which is selected in the above-described evaluation mode.

Input data selecting section 24 selects the output of first force learning data memory section 91 and sends the selected force pattern signal to fuzzy rough classification section 7 and each fine classification section 8. Except that teacher signal selecting section 21 selects the teacher signal of the force learning pattern memorized in first force learning data memory section 91, the learning operation is carried out in the same manner as in the force learning mode of the first embodiment apparatus.

As apparent from the foregoing description, according to the second embodiment of the present invention, the renewal of weighting coefficients is performed in the limited number of fine classification sections which are related to the force learning pattern selected in the second group selecting section 10. Hence, the force learning operation gives no adverse effect to the overall function of the recognition & judgement apparatus. It becomes possible to realize an excellent force learning operation which gives no adverse effect to the recognition ability of the already-learned data.

Third Embodiment

Figure 9:
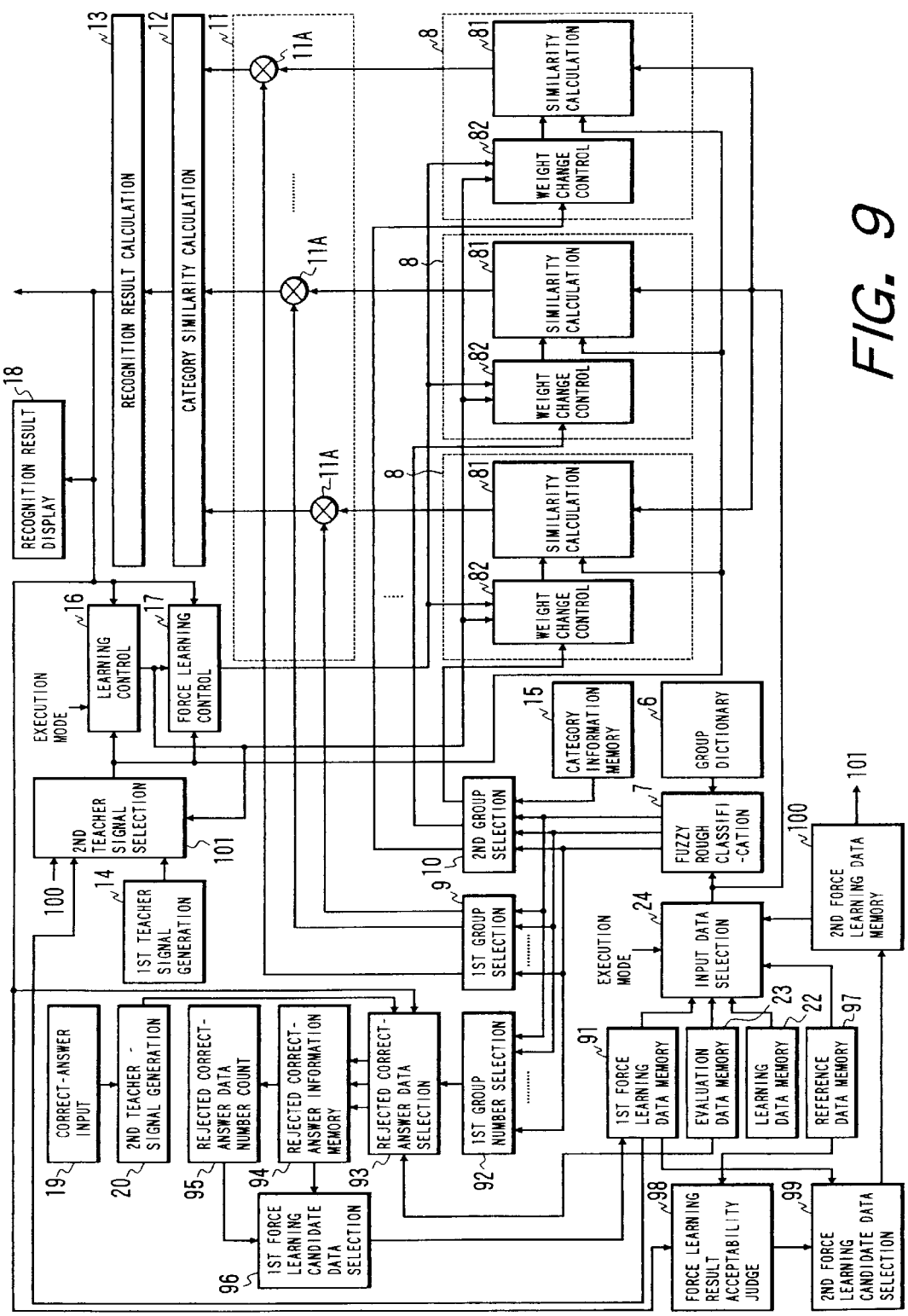
FIG. 9 is a schematic block diagram showing an arrangement of a learning type recognition & judgement apparatus in accordance with a third embodiment of the present invention.

FIG. 9 is a schematic block diagram showing an arrangement of a learning type recognition & judgement apparatus in accordance with a third embodiment of the present invention. The arrangement of the third embodiment is different from that of the second embodiment (FIG. 8) in that the third embodiment comprises a reference data memory section 97 which memorizes reference data, i.e. the pattern data and teacher signal serving as recognition target of this recognition & judgement apparatus, used for evaluating the force learning result relating to the data selected in the first force learning candidate data selecting section 96, a force learning result acceptability judging section 98 which judges the acceptability of the force learning operation by evaluating the recognition result relating to the reference data, a second force learning candidate data selecting section 99 which selects the force learning candidate data judged as acceptable in the force learning result acceptability judging section 98, a second force learning data memory section 100 which memorizes the selected force learning candidate data, and a second teacher signal selecting section 101 which selects one of the output of first teacher signal generating section 14, the category number selected by first force learning candidate data selecting section 96, and the category number selected by second force learning candidate data selecting section 99.

Next, an operation of the above-described learning type recognition & judgement apparatus will be explained. The initial learning mode and the evaluation mode are substantially the same as the corresponding modes of the second embodiment apparatus and therefore will no more be explained. Explained hereinafter is the enhance learning mode.

Input data selecting section 24 selects the output of first force learning data memory section 91 and sends the data to fuzzy rough classification section 7 and each fine classification section 8. The force learning pattern, selected in the evaluation mode and memorized in first force learning data memory section 91, is subjected to the force learning operation about each of the above-described selected low-performance group numbers or categories in the same manner as in the first embodiment apparatus. In response to an accomplishment of the force learning operation for each of the group numbers or categories, input data selecting section 24 selects the reference data memorized in reference data memory section 97. And, the recognition result of the reference data is calculated in the same manner as in the first embodiment.

Force learning result acceptability judging section 98 judges whether the force learning operation is acceptable or not based on the above-described recognition result. The force learning data judged as acceptable is selected by second force learning candidate data selecting section 99 and memorized in second force learning data memory section 100 as final force learning candidate data.

The above-described operation is repeated to finish the force learning operation for all the data memorized in first force learning data memory section 91 as well as the evaluation against the reference data. Upon termination of the above-described operation, the final force learning operation is executed based on the force learning data memorized in second force learning data memory section 100 in the same manner as in the first embodiment.

Force learning result acceptability judging section 98 judges the acceptability of the force learning result by comparing the sum of a multiple (i.e. integer not less than 1) of the number of erroneous reading data and the number of the rejected data obtained after finishing the force learning operation with the sum of the corresponding numbers obtained before executing the force learning operation.

As explained above, according to the third embodiment apparatus, it becomes possible to select the data finally applied the force learning operation by second force learning candidate data selecting section 99 while confirming how the force learning operation for the candidate data selected by first force learning candidate data selecting section 96 gives the effect to the reference data, which is the pattern data serving as a target to be recognized by the recognition & judgement apparatus. Thus, useless force learning data can be deleted and the efficiency of the force learning operation can be improved.

Furthermore, as the renewal of weight values is carried out only for the fine classification sections 8 relating to the force learning pattern, it becomes possible to realize an excellent force learning operation which gives no adverse effect to the overall function of the recognition & judgement apparatus as well as the recognition ability of the already-learned data.

Fourth Embodiment

Figure 10:
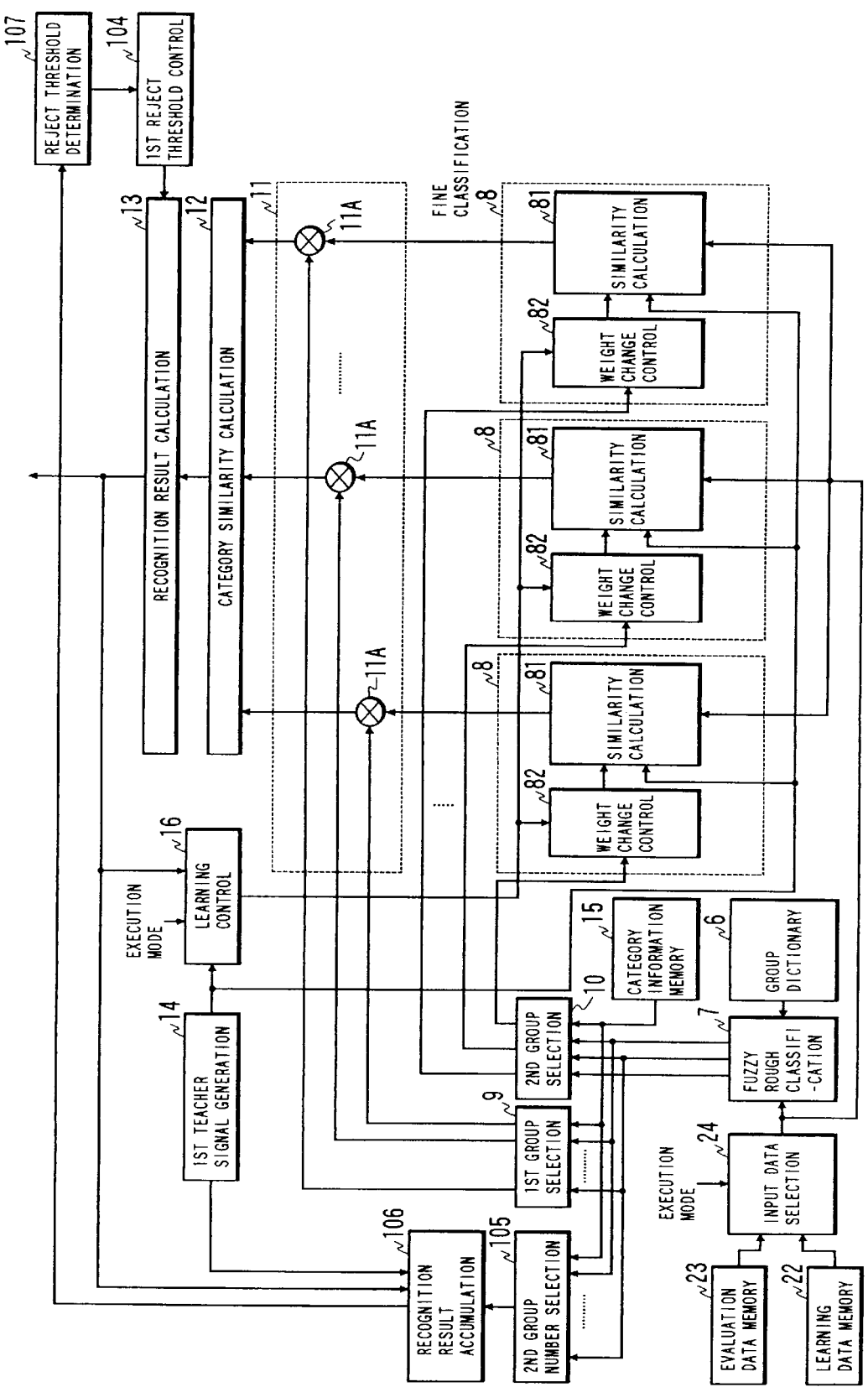
FIG. 10 is a schematic block diagram showing an arrangement of a learning type recognition & judgement apparatus in accordance with a fourth embodiment of the present invention.

FIG. 10 is a schematic block diagram showing an arrangement of a learning type recognition & judgement apparatus in accordance with a fourth embodiment of the present invention. The arrangement of the fourth embodiment is different from that of the first embodiment (FIG. 1) in that the fourth embodiment comprises a first reject threshold control section 104 which generates two kinds of reject thresholds by. adding and subtracting a constant value "x" to and from the preset reject threshold, a second group number selecting section 105 which selects the group number having the most-largest group attribution factor with respect to the evaluation data, a recognition result accumulating section 106 which receives the recognition result of the evaluation data and the category number outputted from the first teacher signal generating section 14 and accumulates the number of erroneous reading and rejected data in connection with each of the group number selected and category, and a reject threshold determining section 107 which determines a reject threshold in connection with group number or category based on the comparison in each of the group number or the category between the accumulation result with respect to the predetermined reject threshold and the accumulation result with respect to the reject threshold obtained after the above-described change.

An operation of the above-described learning type recognition & judgement apparatus will be explained next. The operating mode of this embodiment is separated into an initial learning mode and an evaluation mode. The initial learning mode is performed in the same manner as in the first embodiment apparatus.

Hereinafter, the operation of the evaluation mode will be explained in greater detail. The evaluation mode is a mode for evaluating the performance of the previously-described initial learning operation by using the evaluation data different from the learning pattern.

Input data selecting section 24 selects the output of evaluation data memory section 23 and sends out the evaluation pattern signal to fuzzy rough classification section 7 and each fine classification 8.

Recognition result calculating section 13 calculates and generates the category similarity of the evaluation pattern signal in the same manner as the initial learning mode. Second group number selecting section 10 selects the group number having the most-largest group attribution factor with respect to the input data.

Recognition result calculating section 13 calculates the recognition result with respect to the above-described category similarity using a total of three kinds of reject thresholds including a predetermined reject threshold and another two reject thresholds obtained by adding and subtracting a constant value "x" to and from the threshold set by first reject threshold control section 104. Recognition result calculating section 13 sends out the calculated recognition result to recognition result accumulating section 106.

Recognition result accumulating section 106 accumulates the number of erroneous reading and rejected data in connection with each of group number and category based on the recognition result for each of the three kinds of reject thresholds and the selected group number. The accumulated results are sent to reject threshold determining section 107.

Reject threshold determining section 107 determines a reject threshold in connection with group number or category based on the comparison in each of the group number or the category between the accumulation result with respect to the predetermined reject threshold and the accumulation result with respect to the reject threshold obtained after the above-described change.

Reject threshold determining section 107, upon completion of the accumulation processing of recognition results for all of evaluation data, determines a reject threshold in the following manner. For example, reject threshold determining section 107 adds a constant value to the reject threshold of the group or category when a sum of N times of an increased number of the erroneous reading data and a reduced number of the rejected data is less than a predetermined value and, on the contrary, subtracts a constant value from the rejected threshold of the group or category when a sum of N times of a reduced number of the erroneous reading data and an increased number of the rejected data is less than a predetermined value.

As explained above, according to the fourth embodiment apparatus, it becomes possible to reduce the erroneous reading data number and rejected data number by setting reject threshold value for each group and each category, thereby enabling effective reject processing.

Fifth Embodiment

Figure 11:
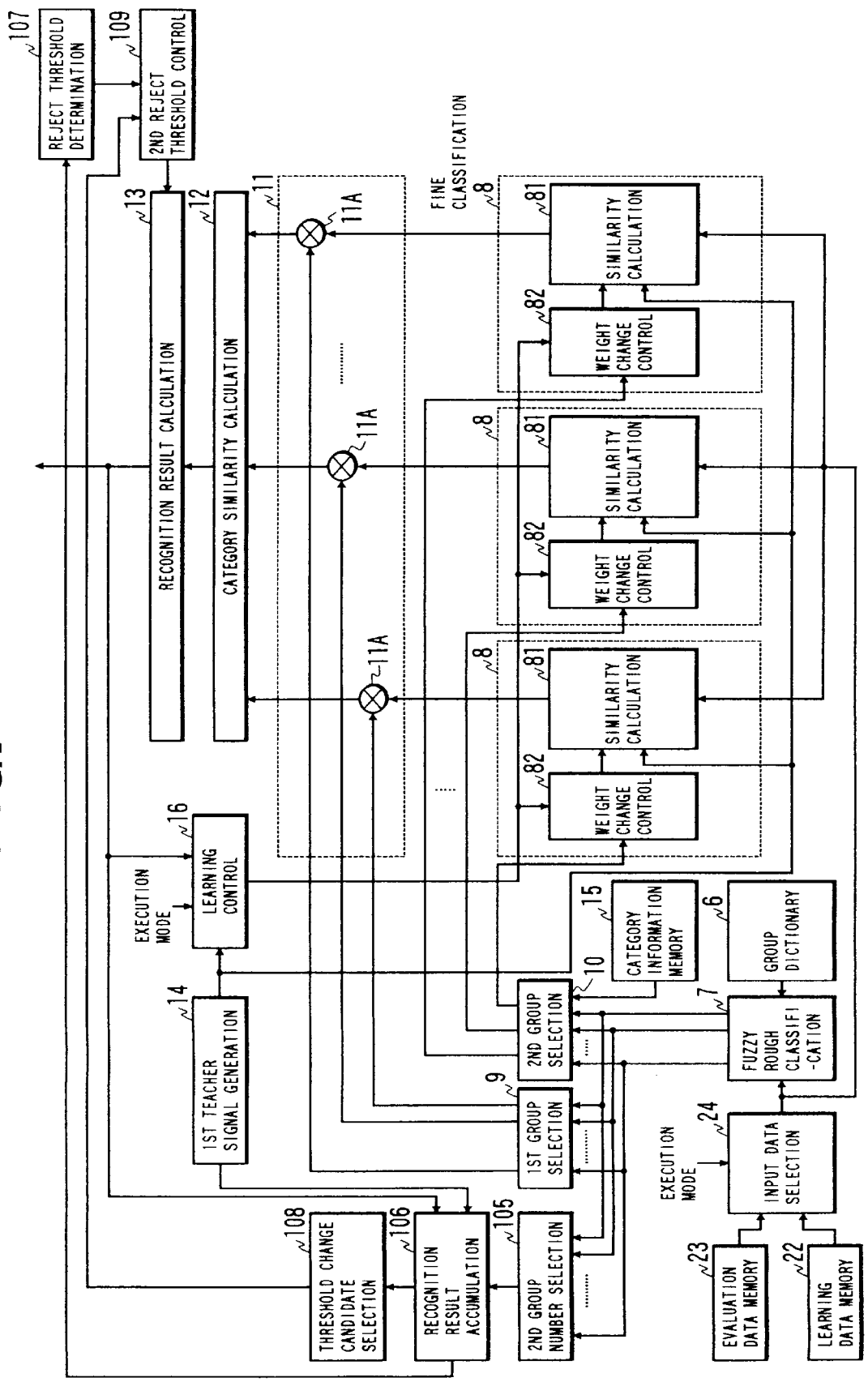
FIG. 11 is a schematic block diagram showing an arrangement of a learning type recognition & judgement apparatus in accordance with a fifth embodiment of the present invention.

FIG. 11 is a schematic block diagram showing an arrangement of a learning type recognition & judgement apparatus in accordance with a fifth embodiment of the present invention. The arrangement of the fifth embodiment is different from that of the fourth embodiment (FIG. 10) in that the fifth embodiment comprises a threshold change candidate selecting section 108 which selects at least one of group numbers or category numbers having a large difference between the number of erroneous reading data and the number of rejected data with reference to the accumulation result with respect to the predetermined reject threshold obtained by the recognition result accumulating section, and a second reject threshold control section 109 which is substituted for first reject threshold control section 104 to add or subtract a constant value "x" to or from the reject threshold of the group or category based on the largeness relationship between the number of erroneous reading data and the number of rejected data in the selected group or category.

An operation of the above-described learning type recognition & judgement apparatus will be explained next. The operating mode is separated into an initial learning mode and an evaluation mode. The initial learning mode is performed in the same manner as in the fourth embodiment apparatus.

The evaluation mode will be explained in greater detail, hereinafter. The evaluation mode is a mode for evaluating the performance of the initial learning operation by using the evaluation data different from the learning pattern.

Input data selecting section 24 selects the output of evaluation data memory section 23 and the evaluation pattern signal is sent to fuzzy rough classification section 7 and each fine classification section 8.

In the same manner as in the initial learning mode, the category similarity is calculated with respect to the evaluation pattern signal and is sent to recognition result calculating section 13, while the group number having the largest group attribution factor with respect to the input data is selected by second group number selecting section 105.

Recognition result calculating section 13 calculates the recognition result with respect to the category similarity using the predetermined reject threshold, and sends the calculated recognition result to recognition result accumulating section 106. Recognition result accumulating section 106 accumulates the number of erroneous reading and rejected data in connection with each group number or category based on the recognition result and the selected group number, and sends out the accumulated result to threshold change candidate selecting section 108.

Threshold change candidate selecting section 108 selects at least one of group numbers and category numbers having a large difference between the number of erroneous reading data and the number of rejected data based on the accumulation result, and sends out the selected number to second reject threshold control section 109. Second reject threshold control section 109 sets the reject threshold number considering the largeness relationship between the number of erroneous reading data and the number of rejected data in the selected group or category in the following manner. When the number of erroneous reading data is larger than the number of rejected data, the reject threshold is determine by subtracting the constant value x from the reject threshold of that group or category. On the contrary, when the number of rejected data is larger than the number of erroneous reading data, the reject threshold is determine by adding the constant value x to the reject threshold of that group or category.

Based on the accumulation result of recognition results with respect to the reject threshold, in the same manner as in the fourth embodiment apparatus, reject threshold determining section 107 determines a reject threshold in connection with group number or category based on the comparison in each of the group number or the category between the accumulation result with respect to the predetermined reject threshold and the accumulation result with respect to the reject threshold obtained after the above-described change.

As apparent from the foregoing description, the fifth embodiment apparatus sets the reject thresholds individually for each of the groups or categories having low recognition ability or poor reject performance, and hence makes it possible to reduce the number of erroneous data and rejected data with respect to the group or category, thereby enabling an effective reject processing.

Sixth Embodiment

Figure 12:
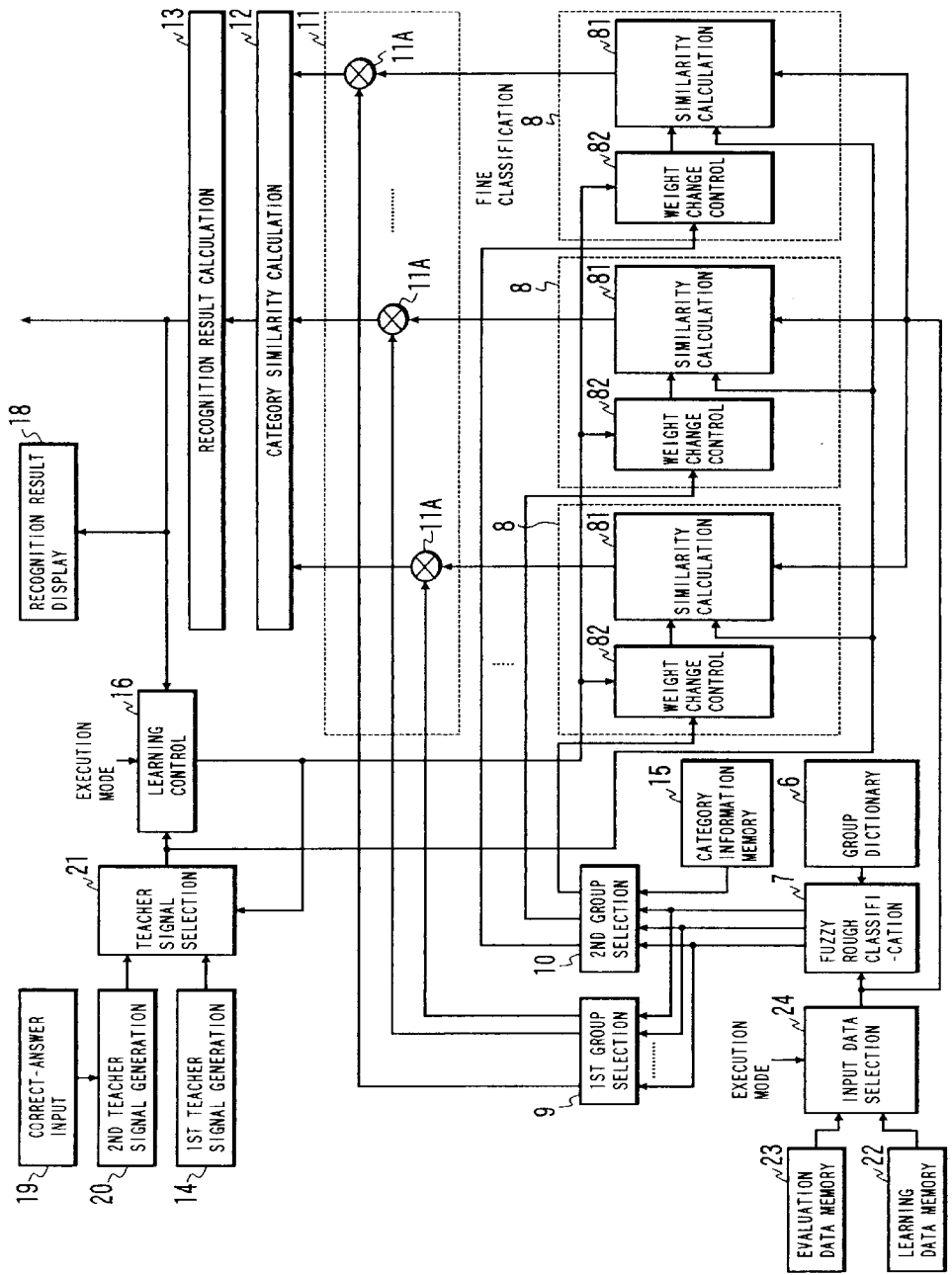
FIG. 12 is a schematic block diagram showing an arrangement of a learning type recognition & judgement apparatus in accordance with a sixth embodiment of the present invention.

FIG. 12 is a schematic block diagram showing an arrangement of a learning type recognition & judgement apparatus in accordance with a sixth embodiment of the present invention. The arrangement of the sixth embodiment is basically identical with that of the first embodiment except that force learning control section 17 is omitted.

An operation of the learning type recognition & judgement apparatus in accordance with the sixth embodiment will be explained hereinafter.

The learning operation is substantially the same as that of the first embodiment and therefore will not be explained. An additional learning operation is explained in greater detail. The additional mode, as an execution mode, is entered into learning control section 16. When a non-learned pattern is entered as the additional learning pattern, recognition result calculating section 13 generates a discrimination result with respect to the input pattern signal X in the same manner as the first embodiment apparatus. The discrimination result thus generated is displayed on the display through recognition result display section 18. When this recognition result is different from the category of the input pattern, second teacher signal generating section 20 sends out a category number corresponding to the category of the input data to teacher signal selecting section 21 in response to an entry of a correct recognition result corresponding to the category of the input data which is entered through correct-answer input section 19 such as a keyboard. Teacher signal selecting section 21 selects the output of second teacher signal generating section 20 when the execution mode is the additional learning mode, and sends out the selected output to each similarity calculating section 81. Second group selecting section 10 selects the fine classification section involving the category of the non-learned pattern. Then, in the same manner as the first embodiment apparatus, the learning operation is performed on the selected fine classification section repetitively until the recognition result of the additional learning pattern generated from recognition result calculating section 13 meets the output of second teacher signal generating section 20. Thus, it becomes possible to recognize the additional learning pattern. The recognition operation is substantially the same as that of the first embodiment and therefore will not be explained.

In this manner, according to the sixth embodiment apparatus, when the discrimination result of the non-learned pattern is erroneous, second group selecting section 10 selects the fine classification 8 involving the category of the input pattern and performs the learning thereon. Thus, it becomes possible to execute the additional learning operation for the non-learning pattern.

Furthermore, as the renewal of weight values is carried out only for the fine classification sections relating to the additional learning pattern as described in the foregoing description, it becomes possible to realize an excellent additional learning operation which gives no adverse effect to the overall function of the recognition & judgement apparatus as well as the recognition ability of the already-learned data.

Seventh Embodiment

Figure 13:
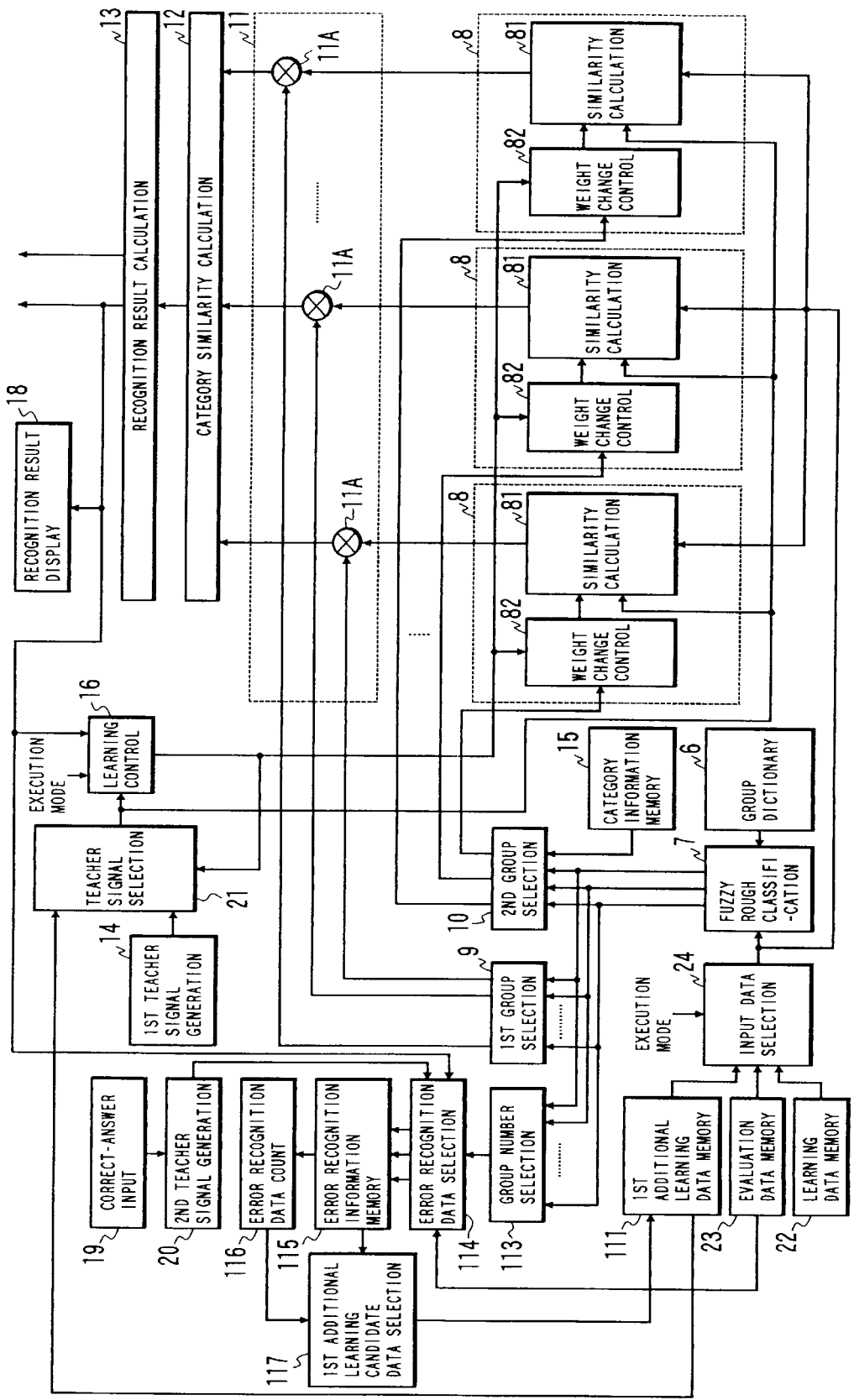
FIG. 13 is a schematic block diagram showing an arrangement of a learning type recognition & judgement apparatus in accordance with a seventh embodiment of the present invention.

FIG. 13 is a schematic block diagram showing an arrangement of a learning type recognition & judgement apparatus in accordance with a seventh embodiment of the present invention. The arrangement of the seventh embodiment is basically similar to that of the second embodiment (FIG. 8) but is different in that the seventh embodiment omits the force learning control section 17 and replaces each of first force learning data memory section 91, first group number selecting section 92, rejected correct-answer data selecting section 93, rejected correct-answer information memory section 94, rejected correct-answer data number counting section 95, and first force learning candidate data selecting section 96 by the following components.

More specifically, in FIG. 13, reference numeral 111 represents a first additional learning data memory section which memorizes the additional learning data selected from the previously-described evaluation data and the teacher signal (category number). Reference numeral 113 represents a group number selecting section which selects the group number having the most-largest group attribution factor with respect to the evaluation data. Reference numeral 114 represents an error recognition data selecting section which judges whether the recognition result is correct or incorrect based on the comparison between the recognition result of the evaluation data and its teacher signal, i.e. the output of second teacher signal generating section 20. If the recognition result is erroneous, error recognition data selecting section 114 sends out the evaluation data, the teacher signal and the group number selected by group number selecting section 113 to an error recognition information memory section 115 which memorizes them. Reference numeral 116 represents an error recognition data counting section which counts the number of erroneous recognition data in connection with each group number and each teacher signal based on the information memorized in error recognition information memory section 115. Reference numeral 117 represents a first additional learning candidate data selecting section which selects the erroneous recognition data and the teacher signal corresponding to the group number and the teacher signal which are large in the number of the counted erroneous recognition data. The first additional learning candidate data selecting section 117 sends out the selected erroneous recognition data and the teacher signal to the first additional learning data memory section 111.

In this manner, according to the seventh embodiment apparatus, when the recognition result is erroneous with respect to the learning pattern signal, second group selecting section 10 selects a plurality of category groups having larger group attribution factors with respect to this learning pattern signal. Fine classification sections 8, corresponding to these category groups, cooperatively perform the learning operation while adjusting the weight change amounts, using the group attribution factors of the learning pattern signal with respect to respective category groups. Thus, it becomes possible to accurately perform the learning operation of the pattern signal positioned on the boundary of the category group.

Next, the operation of the evaluation mode will be explained in greater detail. The evaluation mode is a mode for evaluating the performance of the initial learning operation by using the evaluation data different from the learning pattern signal.

Input data selecting section 24 selects the output of evaluation data memory section 23. The evaluation pattern signal is sent to fuzzy rough classification section 7 and each fine classification section 8. The recognition result is calculated with respect to the evaluation pattern signal in the same manner as in the initial learning mode. The recognition result is displayed through recognition result display section 18, and is also sent to error recognition data selecting section 114.

When the recognition result displayed by recognition result display section 18 is erroneous, a correct answer is entered from correct-answer input section 19. Second teacher signal generating section 20 converts the input signal into a teacher signal (category number) corresponding to erroneous answer, and sends the teacher signal to error recognition data selecting section 114.

Group number selecting section 113 selects the group number having the most-largest group attribution factor with respect to the evaluation pattern signal, and sends the selected group number to error recognition data selecting section 114. Error recognition data selecting section 114 judges the recognition result of the evaluation pattern signal with reference to the teacher signal. If the recognition result is erroneous, data of the evaluation pattern signal is read out from evaluation data memory section 23 and sent to error recognition information memory section 115 together with the teacher signal and the group number corresponding to the evaluation pattern signal.

Error recognition data counting section 116 counts the number of erroneous recognition data in connection with each group number and each teacher signal based on the information memorized in error recognition information memory section 115. Based on the counting result, first additional learning candidate data selecting section 117 selects the data of the evaluation pattern signal and the teacher signal corresponding to the group number and the teacher signal which are large in the number of the counted erroneous recognition data and outputs them to the first additional learning data memory section 111. Thus, the additional learning operation is performed for the data memorized in first additional learning data memory section 111.

As described above, according to the seventh embodiment apparatus, the additional learning operation is not applied to all of erroneous recognition data relating to the evaluation data. Instead, the fine classification sections 8 or categories corresponding to the group numbers having lower recognition ability (i.e. having a large number of erroneous recognition data) are chiefly or primarily selected and applied the additional learning operation. Hence, it becomes possible to increase the efficiency of the additional learning operation.

Next, the additional learning mode will be explained. The additional learning mode is a mode for performing the additional learning operation using the data memorized in first additional learning data memory section 111 which is selected in the above-described evaluation mode.

Input data selecting section 24 selects the output of first additional learning data memory section 111 and sends the selected additional learning pattern signal to fuzzy rough classification section 7 and each fine classification section 8. Except that teacher signal selecting section 21 selects the teacher signal of the additional learning pattern signal memorized in first additional learning data memory section 111, the learning operation for the additional learning pattern signal is carried out in the same manner as in the initial learning mode.

As apparent from the foregoing description, according to the seventh embodiment of the present invention, the renewal of weighting coefficients is performed in the limited number of fine classification sections 8 which are related to the additional learning pattern selected in the second group selecting section 10. Hence, the additional learning operation gives no adverse effect to the overall function of the recognition & judgement apparatus. It becomes possible to realize an excellent additional learning operation which gives no adverse effect to the recognition ability of the already-learned data.

Eighth Embodiment

Figure 14:
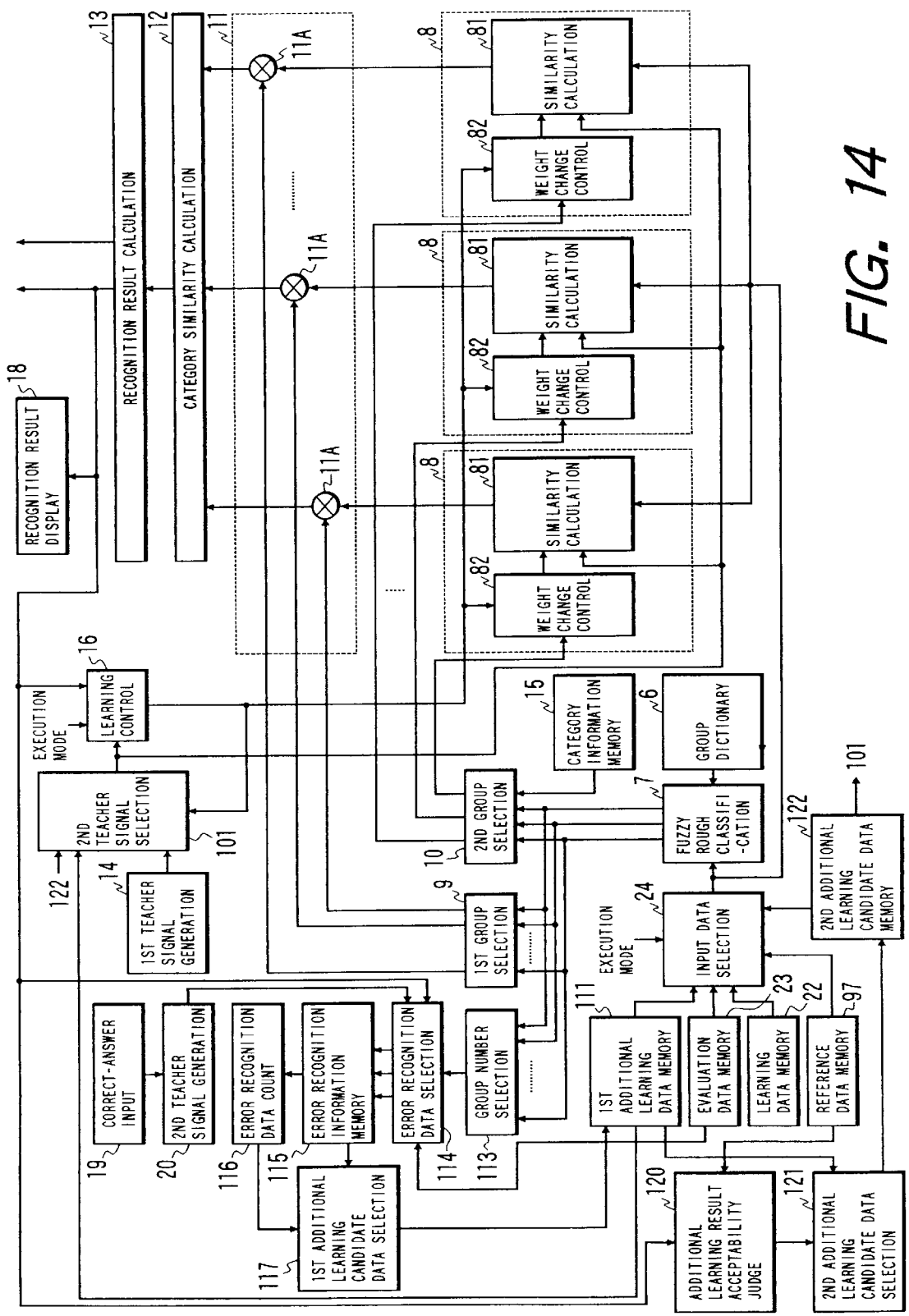
FIG. 14 is a schematic block diagram showing an arrangement of a learning type recognition & judgement apparatus in accordance with an eighth embodiment of the present invention.
Figure 15:
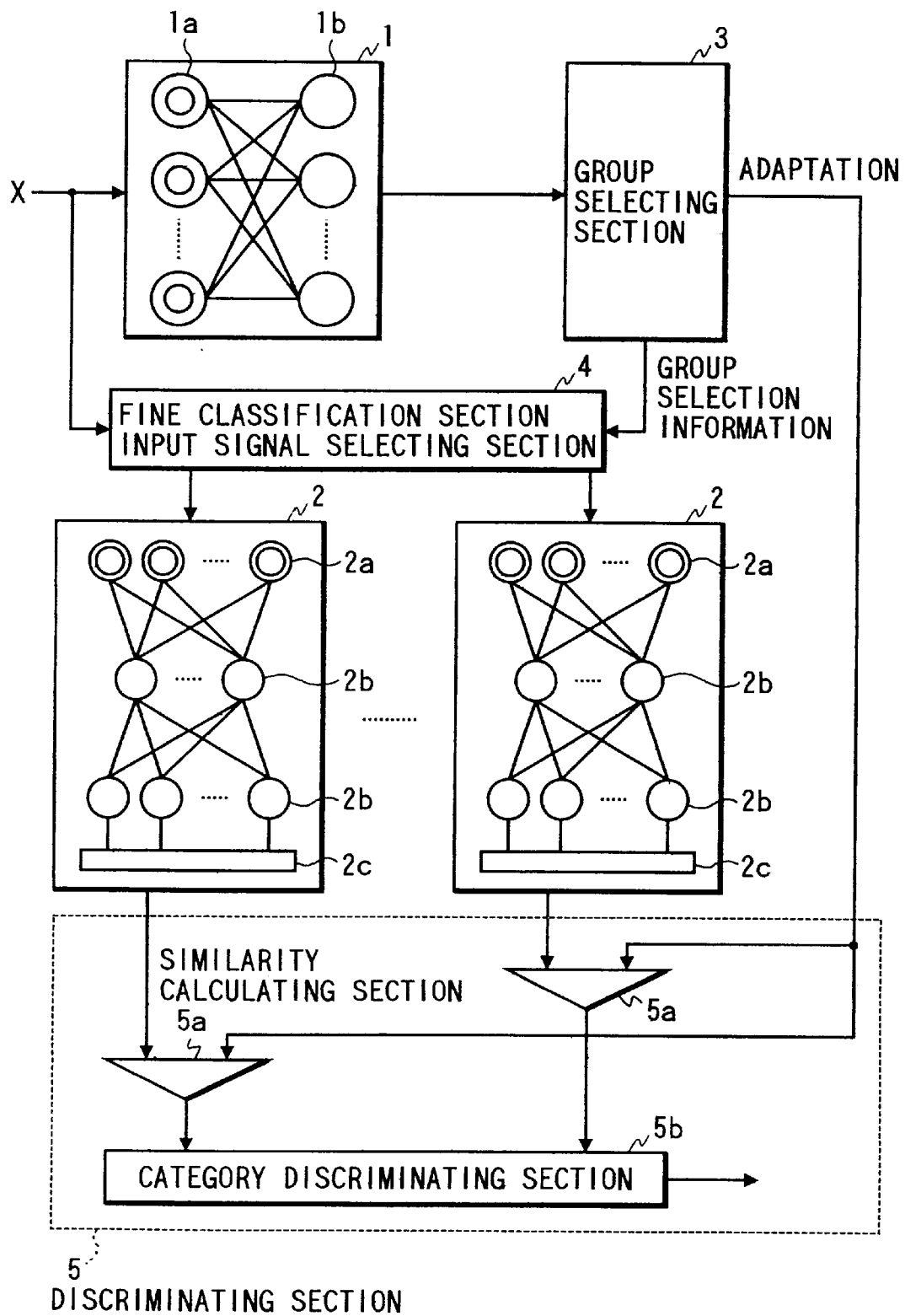
FIG. 15 is a schematic block diagram showing an arrangement of a conventional learning type recognition & judgement apparatus.

FIG. 14 is a schematic block diagram showing an arrangement of a learning type recognition & judgement apparatus in accordance with an eighth embodiment of the present invention. The arrangement of the eighth embodiment is different from that of the seventh embodiment (FIG. 13) in that the eighth embodiment comprises the following components.

In FIG. 14, reference numeral 120 represents an additional learning result acceptability judging section which judges the acceptability of the additional learning operation by evaluating the recognition result relating to the reference data. Reference numeral 121 represents a second additional learning candidate data selecting section which selects the additional learning candidate data judged acceptable by the additional learning result acceptability judging section 120. Reference numeral 122 represents a second additional learning candidate data memory section which memorizes the additional learning candidate data selected by the second additional learning candidate data selecting section 121. Second teacher signal selecting section 101 selects one of the output of first teacher signal generating section 14, the teacher signal (category number) selected by first additional learning candidate data selecting section 117, and the teacher signal (category number) selected by second additional learning candidate data selecting section 121.

An operation of the above-described eighth embodiment apparatus will be explained below. Its initial learning mode and evaluation mode are substantially identical with those of the seventh embodiment apparatus, and hence will not be explained. The additional learning mode will be explained in greater detail hereinafter.

Input data selecting section 24 selects the output of first additional learning data memory section 111 and sends out the selected output to fuzzy rough classification section 7 and each classification section 8. In the same manner as in the seventh embodiment apparatus, the learning operation is applied on the additional learning pattern signal memorized in first additional learning data memory section 111 in connection with each group number or category having low recognition ability selected in the evaluation mode. In response to each completion of the learning operation of the additional learning pattern signal memorized in first additional learning data memory section 111, input data selecting section 24 selects the reference data memorized in reference data memory section 97. Then, the recognition result with respect to the reference data is calculated in the same manner as in the seventh embodiment apparatus.

The above-described operation is repeated until the completion is recognized about the learning operation for each of all the data memorized in first additional learning data memory section 111 as well as the associated evaluation of the reference data. Additional learning result acceptability judging section 120 judges whether the additional learning operation is acceptable or not based on the resultant recognition result. The additional learning data, if judged as acceptable, are selected by second additional learning candidate selecting section 121 and then memorized in second additional learning candidate data memory section 122 as final additional learning candidate data. Upon completion of the above operation, the final additional learning operation is carried out based on the additional learning data memorized in second additional learning candidate data memory section 122 in the same manner as in the seventh embodiment.

Next, the judgement processing in the additional learning result acceptability judging section 120 will be explained in detail. Acceptability of the additional learning result is judged at the time the recognition result has been calculated for all the reference data. For example, the sum of the number of rejected data and a multiple (e.g. integer not less than 1) of the number of erroneous recognition data is used for comparison. More specifically, the acceptability of the additional learning result is judged by the difference between the above-defined sum result obtained before performing the additional learning operation and the above-defined sum result obtained after completing the additional learning operation.

As explained in the foregoing description, according to the eighth embodiment apparatus, it becomes possible to select the data finally applied the additional learning operation by second additional learning candidate data selecting section 121 while confirming how the additional learning operation for the candidate data selected by first additional learning candidate data selecting section 117 gives the effect to the reference data, which is the pattern data serving as a target to be recognized by the recognition & judgement apparatus. Thus, useless additional learning data can be deleted and hence the efficiency of the additional learning operation can be improved.

Furthermore, as the renewal of weight values is carried out only for the fine classification sections relating to the additional learning pattern signal, it becomes possible to realize an excellent additional learning operation which gives no adverse effect to the overall function of the recognition & judgement apparatus as well as the recognition ability of the already-learned data.

Moreover, it becomes possible to improve the efficiencies of the force learning operation, the supplementary learning operation and the additional learning operation in the learning type recognition & judgement apparatus by adequately combining the arrangements of the above-described embodiments.

As explained in the foregoing description, the learning type recognition & judgement apparatus of the present invention brings the following effects.

When the discrimination result to a certain learning pattern signal is erroneous, the weight change amount control section changes the weight change amount in a corresponding similarity calculating section in accordance with the group attribution factor selected by the second group selecting section. Thus, the fine classification sections perform the learning operation cooperatively by using the attribution factor corresponding to the category group of the learning pattern.

Furthermore, providing the supplementary learning control section allows the following operations. When the recognition result is erroneous, the (additional) learning operation in the fine classification section selected by the second group selecting section is controlled with reference to the entered correct recognition result until the resultant recognition result is equalized with the correct recognition result.

Furthermore, in case of the rejected correct-answer data, the (force) learning operation in the fine classification section selected by the second group selecting section is controlled until the reject judge value is reduced below the predetermined reject threshold. Accordingly, it becomes possible to reduce the number of erroneous recognition and rejected correct-answer.

Furthermore, as the renewal of weight values is carried out only for the fine classification sections relating to the supplementary learning pattern, it becomes possible to realize an excellent supplementary learning operation which gives no adverse effect to the overall function of the recognition & judgement apparatus as well as the recognition ability of the already-learned data.

Still further, providing the first additional learning candidate data selecting section makes it possible to perform the additional learning operation chiefly or primarily on the fine classification sections or categories of the group numbers having low recognition ability without applying the additional learning operation to all of the erroneous recognition data. Hence, the efficiency of the additional learning operation can be improved.

Yet further, providing the additional learning result acceptability judging section and the second additional learning candidate data selecting section makes it possible to select additional learning candidate data while confirming what kind of effect is given to the reference data which is the target data to be recognized by the present invention recognition & judgement apparatus. Thus, useless additional learning data can be deleted and hence the efficiency of the additional learning operation can be improved.

Furthermore, providing the first force learning candidate data selecting section makes it possible to perform the force learning operation chiefly or primarily on the fine classification sections or categories of the group numbers having low recognition ability without applying the force learning operation to all of the rejected correct-answer data. Hence, the efficiency of the force learning operation can be improved.

Still further, providing the force learning result acceptability judging section and the second force learning candidate data selecting section makes it possible to select the force learning candidate while confirming what kind of effect is given to the reference data which is the target data to be recognized by the present invention recognition & judgement apparatus. Thus, useless force learning data can be deleted and hence the efficiency of the force learning operation can be improved.

Yet further, providing the first reject threshold control section, the second group number selecting section, the recognition result accumulating section and the reject threshold determining section makes it possible to set the reject thresholds individually for each of the groups or categories and hence makes it possible to reduce the number of erroneous reading data and rejected data, thus enabling an effective reject processing.

Moreover, providing the threshold change candidate selecting section and the second reject threshold control section makes it possible to set the reject thresholds individually for the groups or categories having low recognition ability or poor reject performance, and hence makes it possible to reduce the number of erroneous reading data and rejected data with respect to these groups or categories, thus enabling an effective reject processing.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A learning type recognition & judgement apparatus comprising:

a group dictionary section for memorizing a plurality of group reference pattern signals representative of category groups consisting of a set of similar patterns;

a fuzzy rough classification section for calculating group attribution factors of each input pattern signal with reference to said group reference pattern signals, each of said group attribution factors representing an attribution degree of said input pattern signal to each category group;

a first group selecting section for selecting at least one of category groups based on said group attribution factors;

a plurality of fine classification sections, each including a similarity calculating section and a weight change amount control section said similarity calculating section calculating an in-group similarity representing a similarity degree of the input pattern signal with respect to each category involved in the same category group, while said weight change amount control section controlling a weight change amount of an associated similarity calculating section in accordance with an output of a second group selecting section;

a discrimination signal weighting section which gives weights to said in-group similarities obtained by fine classification sections based on the group attribution factors of the category groups selected by first group selecting section;

a category similarity calculating section which obtains a category similarity representing a belonging degree to each category based on an output of said discrimination signal weighting section;

a recognition result calculating section which generates a recognition result or a reject signal based on the category similarity calculated by said category similarity calculating section;

a teacher signal generating section which generates a teacher signal required to learn said fine classification section;

a category information memory section which memorizes category information belonging to each fine classification section;

said second group selecting section selecting at least one larger group attribution factors in the fine classification sections comprising the category of the input pattern signal, based on said category information memorized in said category information memory section;

a learning control section which controls a learning operation of each fine classification section in accordance with a comparison between said recognition result of said recognition result calculating section and a category of input pattern outputted from said teacher signal generating section;

a recognition result display section which displays a judgement result of said recognition result calculating section;

a correct-answer input section which inputs a correct recognition result when said recognition result is erroneous or rejected regardless of its correctness; and a supplementary learning control section which controls the learning operation of specific fine classification sections relating to erroneously recognized data or rejected correct-answer data with reference to said correct recognition result entered from said correct-answer input section, wherein:
said similarity calculating section is constituted be a multi-layer structure comprising a most-lowest layer consisting of a plurality of third unit recognizers, a previous or preceding layer of said most-lowest layer consisting of a plurality of second unit recognizers, and another layer consisting of a plurality of first unit recognizers;

said first unit recognizer comprises:
a signal input section receiving an input signal; a quantizer converting the input signal into a quantized level; a neighboring section selector selecting a neighboring quantized section of a concerned quantized section corresponding to the input signal; a weight table memorizing weight values corresponding to said quantized section of said input signal and its neighboring quantized section; a route input section having at least one route input terminal; a route output section having at least one route output terminal; and a route weighting section varying a linkage intensity between said route input terminal of said route input section and said route output terminal of said route output section by changing a setting position of each weight to be applied to the route in accordance with a quantized result;

said second unit recognizer comprises:
a signal input section receiving an input signal; a quantizer converting the input signal into a quantized level; a route input section having at least one route input terminal; a route output section having at least one route output terminal; a transfer amount change section shifting a transmission value be several bits when said transmission value is entered from said route input terminal of said route input section, and a learning unit renewing linkage intensity between said route input terminal and a route output terminal of said route output terminal indicated by an output of said quantizer in accordance with an output of said transfer amount change section, said third unit recognizer comprises:
an adder adding input signals entered through its plural route input terminals, and a threshold processing unit processing an output of said adder by a given threshold, and said similarity calculating section firer comprises a teacher signal converting section which converts an output of said teacher signal generating section into a signal identifying a specific third unit recognizer which should generate a maximum output in said fine classification section, and an output of said teacher signal converting section is entered into the signal input section of said second unit recognizers.

2. A learning type recognition & judgement apparatus comprising:

a group dictionary section for memorizing a plurality of group reference pattern signals representative of category groups consisting of a set of similar patterns;

a fuzzy rough classification section for calculating group attribution factors of each input pattern signal with reference to said group reference pattern signals, each of said group attribution factors representing an attribution degree of said input pattern signal to each category group;

a first group selecting section for selecting at least one of category groups based on said group attribution factors;

a plurality of fine classification sections, each including a similarity calculating section and a weight change amount control section, said similarity calculating section calculating an in-group similarity representing a similarity degree of the input pattern signal with respect to each category involved in the same category group, while said weight change amount control section controlling a weight change amount of an associated similarity calculating section in accordance with an output of a second group selecting section;

a discrimination signal weighting section which gives weights to said in-group similarities obtained by fine classification sections based on the group attribution factors of the category groups selected by first group selecting section;

a category similarity calculating section which obtains a category similarity representing a belonging degree to each category based on an output of said discrimination signal weighting section;

a recognition result calculating section which generates a recognition result or a reject signal based on the category similarity calculated by said category similarity calculating section;

a teacher signal generating section which generates a teacher signal required to learn said fine classification section;

a category information memory section which memorizes category information belonging to each fine classification section;

said second group selecting section selecting at least one larger group attribution factors in the fine classification sections comprising the category of the input pattern signal, based on said category information memorized in said category information memory section;

a learning control section which controls a learning operation of each fine classification section in accordance with a comparison between said recognition result of said recognition result calculating section and a category of input pattern outputted from said teacher signal generating section;

a recognition result display section which displays a judgement result of said recognition result calculating section;

a correct-answer input section which inputs a correct recognition result when said recognition result is erroneous or rejected regardless of its correctness; and a supplementary learning control section which controls the learning operation of specific fine classification sections relating to erroneously recognized data or rejected correct-answer data with reference to said correct recognition result entered from said correct-answer input section, wherein:
said similarity calculating section is constituted by a multi-layer structure comprising a most-lowest layer consisting of a plurality of third unit recognizers, a previous or preceding layer of said most-lowest layer consisting of a plurality of second unit recognizers, and another layer consisting of a plurality of first unit recognizers;

said first unit recognizer comprises:
a signal input section receiving an input signal; a quantizer converting the input signal into a quantized level; a neighboring section selector selecting a neighboring quantized section of a concerned quantized section corresponding to the input signal; a weight table memorizing weight values corresponding to said quantized section of said input signal and its neighboring quantized section; a route input section having at least one route input terminal; a route output section having at least one route output terminal; and a route weighting section varying a linkage intensity between said route input terminal of said route input section and said route output terminal of said route output section by changing a setting position of each weight to be applied to the route in accordance with a quantized result;

said second unit recognizer comprises:
a signal input section receiving an input signal; a quantizer converting the input signal into a quantized level; a route input section having at least one route input terminal; a route output section having at least one route output terminal; a transfer amount change section shifting a transmission value by several bits when said transmission value is entered from said route input terminal of said route input section, and a learning unit renewing linkage intensity between said route input terminal and a route output terminal of said route output terminal indicated by an output of said quantizer in accordance with an output of said transfer amount change section, said third unit recognizer comprises:

an adder adding input signals entered through its plural route input terminals, and a threshold processing unit processing an output of said adder by a given threshold, and said weight change amount control section controls a bit shift amount in said transfer amount change section of a corresponding similarity calculating section in response to the output of said second group selecting section.

3. A learning type recognition & judgement apparatus comprising:

a group dictionary section for memorizing a plurality of group reference pattern signals representative of category groups consisting of a set of similar patterns;

a fuzzy rough classification section for calculating group attribution factors of each input pattern signal with reference to said group reference pattern signals, each of said group attribution factors representing an attribution degree of said input pattern signal to each category group;

a first group selecting section for selecting at least one of category groups based on said group attribution factors;

a plurality of fine classification sections, each including a similarity calculating section and a weight change amount control section, said similarity calculating section calculating an in-group similarity representing a similarity degree of the input pattern signal with respect to each category involved in the same category group, while said weight change amount control section controlling a weight change amount of an associated similarity calculating section in accordance with an output of a second group selecting section;

a discrimiation signal weighting section which gives weights to said in-group similarities obtained by fine classification sections based on the group attribution factors of the category groups selected by first group selecting section;

a category similarity calculating section which obtains a category similarity representing a belonging degree to each category based on an output of said discrimination signal weighting section;

a recognition result calculating section which generates a recognition result or a reject signal based on the category similarity calculated by said category similarity calculating section;

a teacher signal generating section which generates a teacher signal required to learn said fine classification section;

a category information memory section which memorizes category information belonging to each fine classification section;

said second group selecting section selecting at least one larger soup attribution factors in the fine classification sections comprising the category of the input pattern signal, based on said category information memorized in said category information memory section;

a learning control section which controls a learning operation of each fine classification section in accordance with a comparison between said recognition result of said recognition result calculating section and a category of input pattern outputted from said teacher signal generating section;

a recognition result display section which displays a judgement result of said recognition result calculating section;

a correct-answer input section which inputs a correct recognition result when said recognition result is erroneous or rejected regardless of its correctness; and a supplementary learning control section which controls the learning operation of specific fine classification sections relating to erroneously recognized data or rejected correct-answer data with reference to said correct recognition result entered from said correct-answer input section, wherein:
said similarity calculating section is constituted by a multi-layer structure comprising a most-lowest layer consisting of a plurality of third unit recognizers, a previous or preceding layer of said most-lowest layer consisting of a plurality of second unit recognizers, and another layer consisting of a plurality of first unit recognizers; and further comprises a teacher signal converting section which converts an output of said teacher signal generating section into a signal identifying a specific third unit recognizer which should generate a maximum output in said fine classification section, and an output of said teacher signal converting section is entered into the signal input section of said second unit recognizers.

4. A learning type recognition & judgement apparatus comprising:

a group dictionary section for memorizing a plurality of group reference pattern signals representative of category groups consisting of a set of similar patterns;

a fuzzy rough classification section for calculating group attribution factors of each input pattern signal with reference to said group reference pattern signals, each of said group attribution factors representing an attribution degree of said input pattern signal to each category group;

a first group selecting section for selecting at least one of category groups based on said group attribution factors;

a plurality of fine classification sections, each including a similarity calculating section and a weight change amount control section, said similarity calculating section calculating an in-group similarity representing a similarity degree of the input pattern signal with respect to each category involved in the same category group, while said weight change amount control section controlling a weight change amount of an associated similarity calculating section in accordance with an output of a second group selecting section;

a discrimination signal weighting section which gives weights to said in-group similarities obtained by fine classification sections based on the group attribution factors of the category groups selected by first group selecting section;

a category similarity calculating section which obtains a category similarity representing a belonging degree to each category based on an output of said discrimination signal weighting section;

a recognition result calculating section which generates a recognition result or a reject signal based on the category similarity calculated by said category similarity calculating section;

a teacher signal generating section which generates a teacher signal required to learn said fine classification section;

a category information memory section which memorizes category information belonging to each fine classification section;

said second group selecting section selecting at least one larger group attribution factors in the fine classification sections comprising the category of the input pattern signal, based on said category information memorized in said category information memory section;

a learning control section which controls a learning operation of each fine classification section in accordance with a comparison between said recognition result of said recognition result calculating section and a category of input pattern outputted from said teacher signal generating section;

a recognition result display section which displays a judgement result of said recognition result calculating section;

a correct-answer input section which inputs a correct recognition result when said recognition result is erroneous or rejected regardless of its correctness; and a supplementary learning control section which controls the learning operation of specific fine classification sections relating to erroneously recognized data or rejected correct-answer data with reference to said correct recognition result entered from said correct-answer input section, wherein said weight change amount control section controls a bit shift amount to change a transfer amount in a corresponding similarity calculating section in response to the output of said second group selecting section.

5. A learning type recognition & judgement apparatus comprising:

a group dictionary section for memorizing a plurality of group reference pattern signals representative of category groups consisting of a set of similar patterns;

a fuzzy rough classification section for calculating group attribution factors of each input pattern signal with reference to said group reference pattern signals, each of said group attribution factors representing an attribution degree of said input pattern signal to each category group;

a first group selecting section for selecting at least one of category groups based on said group attribution factors;

a plurality of fine classification sections, each including a similarity calculating section and a weight change amount control section, said similarity calculating section calculating an in-group similarity representing a similarity degree of the input pattern signal with respect to each category involved in the same category group, while said weight change amount control section controlling a weight change amount of an associated similarity calculating section in accordance with an output of a second group selecting section;

a discrimination signal weighting section which gives weights to said in-group similarities obtained by fine classification sections based on the group attribution factors of the category groups selected by first group selecting section;

a category similarity calculating section which obtains a category similarity representing a belonging degree to each category based on an output of said discrimination signal weighting section;

a recognition result calculating section which generates a recognition result or a reject signal based on the category similarity calculated by said category similarity calculating section;

a teacher signal generating section which generates a teacher signal required to learn said fine classification section;

a category information memory section which memorizes category information belonging to each fine classification section;

said second group selecting section selecting at least one larger group attribution factors in the fine classification sections comprising the category of the input pattern signal, based on said category information memorized in said category information memory section;

a learning control section which controls a learning operation of each fine classification section in accordance with a comparison between said recognition result of said recognition result calculating section and a category of input pattern outputted from said teacher signal generating section;

a recognition result display section which displays a judgement result of said recognition result calculating section;

a correct-answer input section which inputs a correct recognition result when said recognition result is erroneous or rejected regardless of its correctness; and a supplementary learning control section which controls the learning operation of specific fine classification sections relating to erroneously recognized data or rejected correct-answer data with reference to said correct recognition result entered from said correct-answer input section, wherein said recognition result calculating section selects a maximum category similarity and a second-largest category similarity to obtain a reject judge value equivalent to a ratio of said selected two category similarities, and generates a reject signal when said reject judge value is larger than a predetermined reject threshold.

6. A learning type recognition & judgement apparatus comprising:

a group dictionary section for memorizing a plurality of group reference pattern signals representative of category groups consisting of a set of similar patterns;

a fuzzy rough classification section for calculating group attribution factors of each input pattern signal with reference to said group reference pattern signals, each of said group attribution factors representing an attribution degree of said input pattern signal to each category group;

a first group selecting section for selecting at least one of category groups based on said group attribution factors;

a plurality of fine classification sections, each including a similarity calculating section and a weight change amount control section, said similarity calculating section calculating an in-group similarity representing a similarity degree of the input pattern signal with respect to each category involved in the same category group, while said weight change amount control section controlling a weight change amount of an associated similarity calculating section in accordance with an output of a second group selecting section;

a discrimination signal weighting section which gives weights to said in-group similarities obtained by fine classification sections based on the group attribution factors of the category groups selected by first group selecting section;

a category similarity calculating section which obtains a category similarity representing a belonging degree to each category based on an output of said discrimination signal weighting section;

a recognition result calculating section which generates a recognition result or a reject signal based on the category similarity calculated by said category similarity calculating section;

a teacher signal generating section which generates a teacher signal required to learn said fine classification section;

a category information memory section which memorizes category information belonging to each fine classification section;

said second group selecting section selecting at least one larger group attribution factors in the fine classification sections comprising the category of the input pattern signal, based on said category information memorized in said category information memory section;

a learning control section which controls a learning operation of each fine classification section in accordance with a comparison between said recognition result of said recognition result calculating section and a category of input pattern outputted from said teacher signal generating section;

a recognition result display section which displays a judgement result of said recognition result calculating section;

a correct-answer input section which inputs a correct recognition result when said recognition result is erroneous or rejected regardless of its correctness; and a supplementary learning control section which controls the learning operation of specific fine classification sections relating to erroneously recognized data or rejected correct-answer data with reference to said correct recognition result entered from said correct-answer input section, further comprising:

a group number selecting section which selects a group number having a maximum group attribution factor among fine classification sections involving the category of an input data based on said category information memorized in said category information memory section;

an additional learning information memory section which memorizes an erroneously recognized input data, its corresponding category number and said selected group number; an error recognition data counting section which counts the number of erroneous recognition data in connection with each group number and each category based on the information memorized in said additional learning information memory section; and a first additional learning candidate selecting section which selects an input data and a category number corresponding to the group number and the category number which are large in the number of the erroneous recognition data counted by said error recognition data counting section.

7. The learning type recognition & judgement apparatus in accordance with claim 6, further comprising:

a reference data memory section which memorizes reference data and a teacher signal used for evaluating a learning result relating to the data selected by said first additional learning candidate selecting section;

an additional learning result acceptability judging section which judges the acceptability of an additional learning operation by evaluating the recognition result relating to said reference data, and a second additional learning candidate selecting section which selects only additional learning candidate data judged acceptable in said additional learning result acceptability judging section.

8. The learning type recognition & judgement apparatus in accordance with claim 7, wherein said additional learning result acceptability judging section judges the acceptability of the additional learning operation based on a change of a sum of the number of rejected data and a multiple (integer not less than 1) of the number of erroneous recognition data before and after the additional learning operation.

9. A learning type recognition & judgement apparatus comprising:

a group dictionary section for memorizing a plurality of group reference pattern signals representative of category groups consisting of a set of similar patterns;

a fuzzy rough classification section for calculating group attribution factors of each input pattern signal with reference to said group reference pattern signals, each of said group attribution factors representing an attribution degree of said input pattern signal to each category group;

a first group selecting section for selecting at least one of category groups based on said group attribution factors;

a plurality of fine classification sections, each including a similarity calculating section and a weight change amount control section, said similarity calculating section calculating an in-group similarity representing a similarity degree of the input pattern signal with respect to each category involved in the same category group, while said weight change amount control section controlling a weight change amount of an associated similarity calculating section in accordance with an output of a second group selecting section;

a discrimination signal weighting section which gives weights to said in-group similarities obtained by fine classification sections based on the group attribution factors of the category groups selected by first group selecting section;

a category similarity calculating section which obtains a category similarity representing a belonging degree to each category based on an output of said discrimination signal weighting section;

a recognition result calculating section which generates a recognition result or a reject signal based on the category similarity calculated by said category similarity calculating section;

a teacher signal generating section which generates a teacher signal required to learn said fine classification section;

a category information memory section which memorizes category information belonging to each fine classification section;

said second group selecting section selecting at least one larger group attribution factors in the fine classification sections comprising the category of the input pattern signal, based on said category information memorized in said category information memory section;

a learning control section which controls a learning operation of each fine classification section in accordance with a comparison between said recognition result of said recognition result calculating section and a category of input pattern outputted from said teacher signal generating section;

a recognition result display section which displays a judgement result of said recognition result calculating section;

a correct-answer input section which inputs a correct recognition result when said recognition result is erroneous or rejected regardless of its correctness; and a supplementary learning control section which controls the learning operation of specific fine classification sections relating to erroneously recognized data or rejected correct-answer data with reference to said correct recognition result entered from said correct-answer input section, wherein said supplementary learning control section controls the learning operation of said fine classification section until a reject judge value is reduced below a predetermined threshold.

10. A learning type recognition & judgement apparatus comprising:

a group dictionary section for memorizing a plurality of group reference pattern signals representative of category groups consisting of a set of similar patterns;

a fuzzy rough classification section for calculating group attribution factors of each input pattern signal with reference to said group reference pattern signals, each of said group attribution factors representing an attribution degree of said input pattern signal to each category group;

a first group selecting section for selecting at least one of category groups based on said group attribution factors;

a plurality of fine classification sections, each including a similarity calculating section and a weight change amount control section, said similarity calculating section calculating an in-group similarity representing a similarity degree of the input pattern signal with respect to each category involved in the same category group, while said weight change amount control section controlling a weight change amount of an associated similarity calculating section in accordance with an output of a second group selecting section;

a discrimination signal weighting section which gives weights to said in-group similarities obtained by fine classification sections based on the group attribution factors of the category groups selected by first group selecting section;

a category similarity calculating section which obtains a category similarity representing a belonging degree to each category based on an output of said discrimination signal weighting section;

a recognition result calculating section which generates a recognition result or a reject signal based on the category similarity calculated by said category similarity calculating section;

a teacher signal generating section which generates a teacher signal required to learn said fine classification section;

a category information memory section which memorizes category information belonging to each fine classification section;

said second group selecting section selecting at least one larger group attribution factors in the fine classification sections comprising the category of the input pattern signal, based on said category information memorized in said category information memory section;

a learning control section which controls a learning operation of each fine classification section in accordance with a comparison between said recognition result of said recognition result calculating section and a category of input pattern outputted from said teacher signal generating section;

a recognition result display section which displays a judgement result of said recognition result calculating section;

a correct-answer input section which inputs a correct recognition result when said recognition result is erroneous or rejected regardless of its correctness; and a supplementary learning control section which controls the learning operation of specific fine classification sections relating to erroneously recognized data or rejected correct-answer data with reference to said correct recognition result entered from said correct-answer input section, further comprising:

a first group number selecting section which selects a group number having the maximum group attribution factor among fine classification sections involving the category of an input data based on said category information memorized in said category information memory section;

a force learning data memory section which memorizes a rejected correct-answer input data, its corresponding category number (teacher signal) and said selected group number;

a rejected correct-answer data number counting section which counts the number of rejected correct-answer data in connection with each of group number and category based on the information memorized in said force learning data memory section; and a first force learning candidate data selecting section which selects input data and category number corresponding to the group number and the category number which are large in the count number of the rejected correct-answer data counted by said rejected correct-answer data number counting section.

11. The learning type recognition & judgement apparatus in accordance with claim 10, further comprising:

a reference data memory section which memorizes reference data and a teacher signal used for evaluating a force learning result relating to the data selected by the first force learning candidate data selecting section;

a force learning result acceptability judging section which judges the acceptability of a force learning operation by evaluating a recognition result relating to said reference data; and a second force learning candidate data selecting section which selects only force learning candidate data judged as acceptable in the force learning result acceptability judging section.

12. The learning type recognition & judgement apparatus in accordance with claim 11, wherein said force learning result acceptability judging section judges the acceptability of the force learning operation based on a change of a sum of the number of rejected data and a multiple (integer not less than 1) of the number of erroneous reading data before and after the force learning operation.

13. A learning type recognition & judgement apparatus comprising:

a group dictionary section for memorizing a plurality of group reference pattern signals representative of category groups consisting of a set of similar patterns;

a fuzzy rough classification section for calculating group attribution factors of each input pattern signal with reference to said group reference pattern signals, each of said group attribution factors representing an attribution degree of said input pattern signal to each category group;

a first group selecting section for selecting at least one of category groups based on said group attribution factors;

a plurality of fine classification sections, each including a similarity calculating section and a weight change amount control section, said similarity calculating section calculating an in-group similarity representing a similarity degree of the input pattern signal with respect to each category involved in the same category group, while said weight change amount control section controlling a weight change amount of an associated similarity calculating section in accordance with an output of a second group selecting section;

a discrimination signal weighting section which gives weights to said in-group similarities obtained by fine classification sections based on the group attribution factors of the category groups selected by first group selecting section;

a category similarity calculating section which obtains a category similarity representing a belonging degree to each category based on an output of said discrimination signal weighting section;

a recognition result calculating section which generates a recognition result or a reject signal based on the category similarity calculated by said category similarity calculating section;

a teacher signal generating section which generates a teacher signal required to learn said fine classification section;

a category information memory section which memorizes category information belonging to each fine classification section;

said second group selecting section selecting at least one larger group attribution factors in the fine classification sections comprising the category of the input pattern signal, based on said category information memorized in said category information memory section;

a learning control section which controls a learning operation of each fine classification section in accordance with a comparison between said recognition result of said recognition result calculating section and a category of input pattern outputted from said teacher signal generating section;

a recognition result display section which displays a judgement result of said recognition result calculating section;

a correct-answer input section which inputs a correct recognition result when said recognition result is erroneous or rejected regardless of its correctness; and a supplementary learning control section which controls the learning operation of specific fine classification sections relating to erroneously recognized data or rejected correct-answer data with reference to said correct recognition result entered from said correct-answer input section, further comprising:

a first reject threshold control section which generates two kinds of reject thresholds by adding and subtracting a constant value to and from a preset reject threshold;

a second group number selecting section which selects a group number having the maximum group attribution factor with respect to evaluation data;

a recognition result accumulating section which accumulates the number of erroneous reading and rejected data in connection with each of said selected group number and category based on a recognition result of said evaluation data; and a first reject threshold determining section which determines a reject threshold in connection with group number or category based on a comparison in each of the group number or the category between an accumulation result with respect to a predetermined reject threshold and an accumulation result with respect to a reject threshold obtained after the above-described change.

14. The learning type recognition & judgement apparatus in accordance with claim 13, further comprising:

a threshold change candidate selecting section which selects at least one of group numbers or category numbers having a large difference between the number of erroneous reading data and the number of rejected data based on an accumulation result in said recognition result accumulating section, and a second reject threshold control section which is substituted for said first reject threshold control section to add or subtract a constant value to or from the reject threshold of said group or category based on the largeness relationship between the number of erroneous reading data and the number of rejected data in the selected group or category.

15. The learning type recognition & judgement apparatus in accordance with claim 14, wherein said reject threshold determining section adds a constant value to the reject threshold of said group or category when a sum of a multiple of an increased number of erroneous reading data and a reduced number of rejected data is less than a predetermined value, and subtracts a constant value from said rejected threshold of said group or category when a sum of a multiple of a reduced number of said erroneous reading data and an increased number of said rejected data is less than a predetermined value.

16. The learning type recognition & judgement apparatus in accordance with claim 13, wherein said reject threshold determining section adds a constant value to the reject threshold of said group or category when a sum of a multiple of an increased number of erroneous reading data and a reduced number of rejected data is less than a predetermined value, and subtracts a constant value from said rejected threshold of said group or category when a sum of a multiple of a reduced number of said erroneous reading data and an increased number of said rejected data is less than a predetermined value.

* * * * *